United States Patent
McDonald et al.

(10) Patent No.: US 12,503,487 B2
(45) Date of Patent: Dec. 23, 2025

(54) METHOD FOR THE REDUCTION OF HOST CELL PROTEINS IN AFFINITY CHROMATOGRAPHY

(71) Applicants: Genentech, Inc., South San Francisco, CA (US); Hoffmann-La Roche Inc., Little Falls, NJ (US)

(72) Inventors: Paul McDonald, San Francisco, CA (US); Richard St. John, Millbrae, CA (US); Marc Wong, San Carlos, CA (US); Roberto Falkenstein, Munich (DE); Wolfgang Koehnlein, Benediktbeuern (DE); Klaus Schwendner, Weilheim (DE); Bernhard Spensberger, Eberfing (DE); Michael Wiedmann, Penzberg (DE); Frank Zettl, Neuried (DE); Annika Kleinjans, Iffeldorf (DE); Carina Kopp, Peißenberg (DE); Benjamin Tran, San Mateo, CA (US); Ryan Erickson, Oakland, CA (US)

(73) Assignees: Genentech, Inc., South San Francisco, CA (US); Hoffmann-La Roche Inc., Little Falls, NJ (US)

( * ) Notice: Subject to any disclaimer, the term of this patent is extended or adjusted under 35 U.S.C. 154(b) by 736 days.

(21) Appl. No.: 17/328,408

(22) Filed: May 24, 2021

(65) Prior Publication Data

US 2022/0169675 A1    Jun. 2, 2022

Related U.S. Application Data

(63) Continuation of application No. 15/900,461, filed on Feb. 20, 2018, now abandoned, which is a continuation of application No. PCT/EP2016/069604, filed on Aug. 18, 2016.

(60) Provisional application No. 62/208,523, filed on Aug. 21, 2015.

(51) Int. Cl.
| | |
|---|---|
| *A61K 39/395* | (2006.01) |
| *C07K 1/22* | (2006.01) |
| *C07K 16/18* | (2006.01) |
| *C07K 16/22* | (2006.01) |
| *C07K 16/28* | (2006.01) |
| *C07K 16/32* | (2006.01) |
| *C07K 16/36* | (2006.01) |

(52) U.S. Cl.
CPC ........... *C07K 1/22* (2013.01); *C07K 16/18* (2013.01); *C07K 16/22* (2013.01); *C07K 16/2854* (2013.01); *C07K 16/32* (2013.01); *C07K 16/36* (2013.01); *C07K 2317/14* (2013.01); *C07K 2317/31* (2013.01)

(58) Field of Classification Search
None
See application file for complete search history.

(56) References Cited

U.S. PATENT DOCUMENTS

| | | |
|---|---|---|
| 6,127,526 A | 10/2000 | Blank et al. |
| 7,332,289 B2 | 2/2008 | Takeda et al. |
| 7,947,813 B2 | 5/2011 | Fahrner et al. |
| 8,715,669 B2 | 5/2014 | Masternak et al. |
| 8,945,552 B2 | 2/2015 | Baehner et al. |
| 2006/0142549 A1 | 6/2006 | Takeda et al. |
| 2008/0312425 A1 | 12/2008 | Bonnerjea et al. |
| 2010/0003254 A1 | 1/2010 | Hattori et al. |
| 2010/0028359 A1 | 2/2010 | Gu et al. |
| 2011/0287009 A1 | 11/2011 | Scheer et al. |
| 2012/0283416 A1 | 11/2012 | Frauenschuh et al. |
| 2013/0096284 A1 | 4/2013 | Ishihara et al. |
| 2013/0336957 A1 | 12/2013 | Wang et al. |
| 2014/0094593 A1 | 4/2014 | Frauenschuh et al. |
| 2016/0237113 A1 | 8/2016 | Minakuchi et al. |
| 2018/0186832 A1 | 7/2018 | McDonald et al. |
| 2018/0186866 A1 | 7/2018 | Falkenstein et al. |
| 2018/0273615 A1 | 9/2018 | Yu et al. |
| 2021/0240354 A1 | 8/2021 | Shiraki |
| 2022/0169675 A1 | 6/2022 | McDonald et al. |

FOREIGN PATENT DOCUMENTS

| | | |
|---|---|---|
| CN | 103497248 A | 1/2014 |
| CN | 104023804 A | 9/2014 |
| CN | 1681837 A | 10/2015 |
| CN | 105263947 | 1/2016 |
| CN | 103596968 A | 2/2021 |
| EP | 1561756 A1 | 8/2005 |
| EP | 2583973 A1 | 4/2013 |
| EP | 3337817 B1 | 9/2021 |
| JP | H08-504080 | 5/1996 |
| JP | 2006-503541 A | 2/2006 |
| JP | 2008-526187 A | 7/2008 |
| JP | 2008-543881 A | 12/2008 |

(Continued)

OTHER PUBLICATIONS

Aboulaich, N., et al., "A novel approach to monitor clearance of host cell proteins associated with monoclonal antibodies" Biotechol Prog 30(5):1114-1124 (Sep. 30, 2014).

Barron, J., et al., "The Effect of Temperature on Conductivity Measurement" REAGECON:1-5 (2005) https://knowledge.reagecon.com/.

Cole-Parmer, et al., "Temperature Effects on Conductivity Measurement" (Media release; Retrieved : Jan. 24, 2022),:1-2 (Jul. 21, 2021) https://www.coleparmer.com/tech-article/temperature-effects-on-conductivity-measureme.

Emerson-Process Management et al., "Theory and Application of Conductivity-Application Data Sheet"( Suppl Ads 43-018/rev. D):1-6 (Jan. 1, 2010) https://www.emerson.com/documents/automation/application-data-sheet-theory-application-of-conductivity-rosemount-en-68442.pdf.

(Continued)

*Primary Examiner* — Yunsoo Kim
(74) *Attorney, Agent, or Firm* — Kathleen Robinson

(57) ABSTRACT

The current invention reports a method for purifying an antibody by reducing the content of a host cell protein. The method employs a wash step with a low conductivity aqueous solution in an affinity chromatography.

14 Claims, No Drawings

Specification includes a Sequence Listing.

(56) References Cited

FOREIGN PATENT DOCUMENTS

| | | |
|---|---|---|
| JP | 2012-507557 A | 3/2012 |
| JP | 2015-083558 A | 4/2015 |
| WO | 92/22653 A1 | 12/1992 |
| WO | 93/17105 A1 | 9/1993 |
| WO | 01/62801 A1 | 8/2001 |
| WO | 03/037911 A2 | 5/2003 |
| WO | 03/070760 A2 | 8/2003 |
| WO | 2004/071408 A2 | 8/2004 |
| WO | 2005/100402 A1 | 10/2005 |
| WO | 2006/072564 A1 | 7/2006 |
| WO | 2006/109592 A1 | 10/2006 |
| WO | 2006/138737 A2 | 12/2006 |
| WO | 2007/068429 A1 | 6/2007 |
| WO | 2007/109163 A2 | 9/2007 |
| WO | 2008/011348 A2 | 1/2008 |
| WO | 2008/011348 A3 | 1/2008 |
| WO | 2009/136286 A2 | 11/2009 |
| WO | 2010/056550 A1 | 5/2010 |
| WO | 2011/038894 A1 | 4/2011 |
| WO | 2011/073389 A1 | 6/2011 |
| WO | 2011/117329 A1 | 9/2011 |
| WO | 2011/162210 A1 | 12/2011 |
| WO | 2012/047732 A2 | 4/2012 |
| WO | 2012/067176 A1 | 5/2012 |
| WO | 2012/164046 | 12/2012 |
| WO | 2013/033517 A1 | 3/2013 |
| WO | 2013/067301 A1 | 5/2013 |
| WO | 2013/177118 A2 | 11/2013 |
| WO | 2013/177118 A3 | 11/2013 |
| WO | 2014/161845 A1 | 10/2014 |
| WO | 2014/186350 A1 | 11/2014 |
| WO | WO-2014207763 A1 * 12/2014 ............... C07K 1/36 |
| WO | 2015/000886 A1 | 1/2015 |
| WO | 2015/024896 A1 | 2/2015 |
| WO | 2015/041218 A1 | 3/2015 |
| WO | WO-2015038888 A1 * 3/2015 ............... A61P 1/04 |
| WO | 2016/154213 A1 | 9/2016 |

OTHER PUBLICATIONS

F. Hoffmann-Laroche, AG et al., "U.S. Appl. No. 61/877,517 entitled: 'Methods and Compositions Comprising Purified Recombinant Polypeptides'":1-105 (Sep. 13, 2013).

Focosi, D., et al., "Immunosuppressive monoclonal antibodies: current and next generation" Clin Microbiol Infect 17(12):1759-1768 (Dec. 1, 2011).

Gan, L.,, "The state-of-art of isolation & purification techniques of antibodies" Chinese Lab Med Clin (Chinese w/Eng. Machine Translation), 10(4):461-464 (Feb. 1, 2013).

GE Healthcare Bio-Sciences AB et al. Antibody Purification Handbook Uppsala, Sweden:General Electric Company,( Suppl 18-1037-46):1-162 ( 2007) www.gelifesciences.com/protein-purification.

GE Healthcare Bio-Sciences AB et al. Hydrophobic Interaaction and Reversed Phase Chromatography: Principles and Methods Uppsala, Sweden: General Electric Company, ( Suppl 11-0012-69 AA):1-168 (Feb. 1, 2006).

Hanania, N., et al., "Lebrikizumab in moderate-to-severe asthma: pooled data from two randomised placebo-controlled studies" Thorax 70(8):748-756 (Aug. 1, 2015).

Hoffmann-Laroche, Inc. et al., "PCT Request Form—RO101 entitled: 'Method for the Reduction of Host Cell Proteins in Affinity Chromatography" WIPO:1-7 (Aug. 16, 2016).

Hoffmann-Laroche, Inc. et al., "U.S. Appl. No. 62/208,523 entitled: 'Method for the reduction of host cell proteins in affinity chromatography'":1-79 (Aug. 21, 2015).

Hogwood, C., et al., "Measurement and control of host cell proteins (HCPs) in CHO cell bioprocesses" Curr Opin Biotechnol 30:153-160 (Dec. 1, 2014).

Honeywell, Inc. et al., "Buffer solution for HPCE, 20 mM sodium phosphate, pH 7.0 (25° C.), Honeywell Fluka™" (Discontinued Solution; Product Code: 15607210; Web Page Retrieved: Jan. 5, 2022),:1 (Jan. 5, 2022) https://www.fishersci.fi/shop/products/buffer-solution-hpce-ph-7-20mm-sodium-phosphate-honeywell-3/15607210.

Hu, X., et al., "Expression and characterization of a bispecific antibody targeting TNF-α and ED-B containing fibronectin" Chin J Biotech 31(5):722-733 (May 31, 2015).

"International Search Report—PCT/EP2016/069162" (w/Written Opinion), :pp. 1-12 (Oct. 4, 2016).

"International Search Report—PCT/EP2016/069163" (w/Written Opinion), :pp. 1-12 (Dec. 5, 2016).

"International Search Report—PCT/EP2016/069604" (w/Written Opinion), :pp. 1-14 (Oct. 26, 2016).

Ishihara, T., et al., "Improving Impurities Clearance by Amino Acids Addition to Buffer Solutions for Chromatographic Purifications of Monoclonal Antibodies" J Chromatogr B Analyt Technol Niomed Life Sci 995-996:107-114 (Jul. 15, 2015).

Liu, H., et al., "Recovery and purification process development for monoclonal antibody production" MABS 2(5):480-499 (Sep. 30, 2010).

Lu, R., et al., "Development of therapeutic antibodies for the treatment of diseases" J Biomed Sci 27(1):1-30 (Jan. 2, 2020).

Molden, R., et al., "Host cell protein profiling of commercial therapeutic protein drugs as a benchmark for monoclonal antibody-based therapeutic protein development" MABS 13(1):e1955811 (1-13) (Aug. 7, 2021).

OTT Hydromet et al., "Measuring Conductivity of Water: Temperature Compensation and Derivatives" OTT Blog-Team:1-4 (Apr. 23, 2015) https://blog.otthydromet.com/en/.

Ritzen, U., et al., "Endotoxin reduction in monoclonal antibody preparations using arginine" J Chromatogr B Analyt Technol Biomed Life Sci 856(1-2):343-347 (Sep. 1, 2007).

Sauermost, R. Herder-Lexikon Physik : mit über 2300 Stichwörtern, sowie über 650 Abb. u. Tab "Excerpt pp. 136-137" Gütersloh, North Rhine-Westphalia, Germany:Gütersloh Bertelsmann-Club,:136-137 (1985).

Shell Chemicals et al., CAS Registry Database, 107-41-5, (Data Sheet, US 3.2.13A; 6th edition), pp. 1-3Release Date Jul. 1, 2001.

Shukla, A. et al., "Host cell protein clearance during protein A chromatography: development of an improved column wash step" Biotechnol Prog 24(5):1115-1121 (Oct. 14, 2008).

Starovasnik, M., et al., "Antibody variable region binding by Staphylococcal protein A: Thermodynamic analysis and location of the Fv binding site on E-domain" Protein Sci 8(7):1423-1431 (Jul. 1, 1999).

Tran, B. et al., "Investigating interactions between phospholipase B-Like 2 and antibodies during Protein A chromatography" J Chromatograph A 1438:31-38 (Mar. 18, 2016).

Valente, K., et al., "Expression of difficult-to-remove host cell protein impurities during extended Chinese hamster ovary cell culture and their impact on continuous bioprocessing" Biotechnol Bioeng 112(6):1232-1242 (Jun. 1, 2015).

Vanderlaan, M., et al., "Hamster phospholipase B-like 2 (PLBL2); A host-cell protein impurity in therapeutic monoclonal antibodies derived from Chinese hamster ovary cells" Bioprocess Intl 13(4):18-55 (Apr. 1, 2015).

Vanderlaan, M., et al., "Hamster phospholipase B-like 2 (PLBL2); A host-cell protein impurity in therapeutic monoclonal antibodies derived from Chinese hamster ovary cells" (Audio Transcript),:1 (Apr. 1, 2015).

Vanderlaan, M., "Recent Experiences with Host Cell Protein Impurity Analysis" Slides CASSS Conference 2014, South San Francisco, CA-US, pp. 1-16 (Nov. 13, 2014).

Wilson, R., et al., "Clusterin binds by a multivalent mechanism to the Fc and Fab regions of IgG" Biochim Biophys Acta 1159(3):319-326 (Oct. 20, 1992).

Wyatt, A., et al., "Structural characterization of clusterin-chaperone client protein complexes" J Biol Chem 284(33):21920-21927 (Aug. 14, 2009).

Yin, X., et al., "RG7212 Anti-TWEAK mAb Inhibits Tumor Growth through Inhibition of Tumor Cell Proliferation and Survival Signaling and by Enhancing the Host Antitumor Immune Response" Clin Cancer Res 19(20):5686-5698 (Oct. 15, 2013).

(56) References Cited

OTHER PUBLICATIONS

Yuk, I.H., et al., "More similar than different: Host cell protein production using three null CHO cell lines" Biotechnol Bioeng 112(10):2068-2083 (Oct. 1, 2015).
Zhang, Q., et al., "Comprehensive tracking of host cell proteins during monoclonal antibody purifications using mass spectrometry" MABS 6(3):659-670 (May 1, 2014).
Zhang, Q., et al., "Comprehensive tracking of host cell proteins during monoclonal antibody purifications using mass spectrometry" MABS 6(3 Suppl 28120):1-11 (May 1, 2014).
Edman et al., "Electric Field Directed Nucleic Acid Hybridization on Microchips" Nucleic Acids Research 25(24):4907-4914 (Sep. 11, 1997).

* cited by examiner

SEQUENCE LISTING

```
<160> NUMBER OF SEQ ID NOS: 12

<210> SEQ ID NO 1
<211> LENGTH: 123
<212> TYPE: PRT
<213> ORGANISM: Artificial
<220> FEATURE:
<223> OTHER INFORMATION: variable heavy chain domain VH of <VEGF>
      bevacizumab

<400> SEQUENCE: 1

Glu Val Gln Leu Val Glu Ser Gly Gly Gly Leu Val Gln Pro Gly Gly
1               5                   10                  15

Ser Leu Arg Leu Ser Cys Ala Ala Ser Gly Tyr Thr Phe Thr Asn Tyr
            20                  25                  30

Gly Met Asn Trp Val Arg Gln Ala Pro Gly Lys Gly Leu Glu Trp Val
        35                  40                  45

Gly Trp Ile Asn Thr Tyr Thr Gly Glu Pro Thr Tyr Ala Ala Asp Phe
    50                  55                  60

Lys Arg Arg Phe Thr Phe Ser Leu Asp Thr Ser Lys Ser Thr Ala Tyr
65                  70                  75                  80

Leu Gln Met Asn Ser Leu Arg Ala Glu Asp Thr Ala Val Tyr Tyr Cys
                85                  90                  95

Ala Lys Tyr Pro His Tyr Tyr Gly Ser Ser His Trp Tyr Phe Asp Val
            100                 105                 110

Trp Gly Gln Gly Thr Leu Val Thr Val Ser Ser
        115                 120

<210> SEQ ID NO 2
<211> LENGTH: 107
<212> TYPE: PRT
```

```
<213> ORGANISM: Artificial
<220> FEATURE:
<223> OTHER INFORMATION: variable light chain domain VL of <VEGF>
      bevacizumab

<400> SEQUENCE: 2

Asp Ile Gln Met Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Val Leu Ile
        35                  40                  45

Tyr Phe Thr Ser Ser Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Ser Thr Val Pro Trp
                85                  90                  95

Thr Phe Gly Gln Gly Thr Lys Val Glu Ile Lys
            100                 105

<210> SEQ ID NO 3
<211> LENGTH: 128
<212> TYPE: PRT
<213> ORGANISM: Artificial
<220> FEATURE:
<223> OTHER INFORMATION: variable heavy chain domain VH of <ANG-2> E6Q

<400> SEQUENCE: 3

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Gly Tyr
            20                  25                  30

Tyr Met His Trp Val Arg Gln Ala Pro Gly Gln Gly Leu Glu Trp Met
        35                  40                  45

Gly Trp Ile Asn Pro Asn Ser Gly Gly Thr Asn Tyr Ala Gln Lys Phe
    50                  55                  60

Gln Gly Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Pro Asn Pro Tyr Tyr Tyr Asp Ser Ser Gly Tyr Tyr Tyr
            100                 105                 110

Pro Gly Ala Phe Asp Ile Trp Gly Gln Gly Thr Met Val Thr Val Ser
        115                 120                 125

<210> SEQ ID NO 4
<211> LENGTH: 108
<212> TYPE: PRT
<213> ORGANISM: Artificial
<220> FEATURE:
<223> OTHER INFORMATION: variable light chain domain VL of < ANG-2> E6Q

<400> SEQUENCE: 4

Gln Pro Gly Leu Thr Gln Pro Pro Ser Val Ser Val Ala Pro Gly Gln
1               5                   10                  15

Thr Ala Arg Ile Thr Cys Gly Gly Asn Asn Ile Gly Ser Lys Ser Val
            20                  25                  30

His Trp Tyr Gln Gln Lys Pro Gly Gln Ala Pro Val Leu Val Val Tyr
```

```
            35                  40                  45
Asp Asp Ser Asp Arg Pro Ser Gly Ile Pro Glu Arg Phe Ser Gly Ser
         50                  55                  60
Asn Ser Gly Asn Thr Ala Thr Leu Thr Ile Ser Arg Val Glu Ala Gly
 65                  70                  75                  80
Asp Glu Ala Asp Tyr Tyr Cys Gln Val Trp Asp Ser Ser Asp His
                 85                  90                  95
Tyr Val Phe Gly Thr Gly Thr Lys Val Thr Val Leu
            100                 105

<210> SEQ ID NO 5
<211> LENGTH: 126
<212> TYPE: PRT
<213> ORGANISM: Homo sapiens

<400> SEQUENCE: 5

Gln Val Glu Leu Val Glu Ser Gly Gly Gly Leu Val Gln Pro Gly Gly
 1               5                  10                  15
Ser Leu Arg Leu Ser Cys Ala Ala Ser Gly Phe Thr Phe Ser Ser Tyr
            20                  25                  30
Ala Met Ser Trp Val Arg Gln Ala Pro Gly Lys Gly Leu Glu Trp Val
        35                  40                  45
Ser Ala Ile Asn Ala Ser Gly Thr Arg Thr Tyr Tyr Ala Asp Ser Val
    50                  55                  60
Lys Gly Arg Phe Thr Ile Ser Arg Asp Asn Ser Lys Asn Thr Leu Tyr
 65                  70                  75                  80
Leu Gln Met Asn Ser Leu Arg Ala Glu Asp Thr Ala Val Tyr Tyr Cys
                 85                  90                  95
Ala Arg Gly Lys Gly Asn Thr His Lys Pro Tyr Gly Tyr Val Arg Tyr
            100                 105                 110
Phe Asp Val Trp Gly Gln Gly Thr Leu Val Thr Val Ser Ser
        115                 120                 125

<210> SEQ ID NO 6
<211> LENGTH: 108
<212> TYPE: PRT
<213> ORGANISM: Homo sapiens

<400> SEQUENCE: 6

Asp Ile Val Leu Thr Gln Ser Pro Ala Thr Leu Ser Leu Ser Pro Gly
 1               5                  10                  15
Glu Arg Ala Thr Leu Ser Cys Arg Ala Ser Gln Ser Val Ser Ser Ser
            20                  25                  30
Tyr Leu Ala Trp Tyr Gln Gln Lys Pro Gly Gln Ala Pro Arg Leu Leu
        35                  40                  45
Ile Tyr Gly Ala Ser Ser Arg Ala Thr Gly Val Pro Ala Arg Phe Ser
    50                  55                  60
Gly Ser Gly Ser Gly Thr Asp Phe Thr Leu Thr Ile Ser Ser Leu Glu
 65                  70                  75                  80
Pro Glu Asp Phe Ala Thr Tyr Tyr Cys Leu Gln Ile Tyr Asn Met Pro
                 85                  90                  95
Ile Thr Phe Gly Gln Gly Thr Lys Val Glu Ile Lys
            100                 105

<210> SEQ ID NO 7
<211> LENGTH: 124
<212> TYPE: PRT
```

```
<213> ORGANISM: Homo sapiens

<400> SEQUENCE: 7

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Asp Met His Trp Val Arg Gln Ala Thr Gly Lys Gly Leu Glu Trp Val
        35                  40                  45

Ser Gly Ile Thr Thr Ala Gly Asp Thr Tyr Tyr Pro Gly Ser Val Lys
    50                  55                  60

Gly Arg Phe Thr Ile Ser Arg Glu Asn Ala Lys Asn Ser Leu Tyr Leu
65                  70                  75                  80

Gln Met Asn Ser Leu Arg Ala Gly Asp Thr Ala Val Tyr Tyr Cys Ala
            85                  90                  95

Arg Gly Arg Ile Ser Met Asp Arg Gly Val Lys Asn Asn Trp Phe Asp
        100                 105                 110

Pro Trp Gly Gln Gly Thr Leu Val Thr Val Ser Ser
        115                 120
```

```
<210> SEQ ID NO 8
<211> LENGTH: 124
<212> TYPE: PRT
<213> ORGANISM: Homo sapiens

<400> SEQUENCE: 8

Glu Val Gln Leu Val Glu Ser Gly Gly Gly Leu Val Arg Pro Gly Gly
1               5                   10                  15

Ser Leu Arg Leu Ser Cys Ala Ala Ser Gly Phe Thr Phe Ser Asn Tyr
            20                  25                  30

Asp Met His Trp Val Arg Gln Ala Thr Gly Lys Gly Leu Glu Trp Val
        35                  40                  45

Ser Ala Ile Thr Ala Ala Gly Asp Ile Tyr Tyr Pro Gly Ser Val Lys
    50                  55                  60

Gly Arg Phe Thr Ile Ser Arg Glu Asn Ala Lys Asn Ser Leu Tyr Leu
65                  70                  75                  80

Gln Met Asn Ser Leu Arg Ala Gly Asp Thr Ala Val Tyr Tyr Cys Ala
            85                  90                  95

Arg Gly Arg Tyr Ser Gly Ser Gly Ser Tyr Tyr Asn Asp Trp Phe Asp
        100                 105                 110

Pro Trp Gly Gln Gly Thr Leu Val Thr Val Ser Ser
        115                 120
```

```
<210> SEQ ID NO 9
<211> LENGTH: 124
<212> TYPE: PRT
<213> ORGANISM: Homo sapiens

<400> SEQUENCE: 9

Gln Pro Gln Leu Val Gln Ser Gly Ala Glu Val Lys Lys Pro Gly Ala
1               5                   10                  15

Ser Val Lys Val Ser Cys Lys Val Ser Gly Asn Thr Leu Thr Glu Leu
            20                  25                  30

Ser Met His Trp Val Arg Gln Ala Pro Gly Lys Gly Leu Glu Trp Met
        35                  40                  45

Gly Gly Phe Asp Pro Glu Asn Gly Glu Ala Ile Tyr Ala Gln Lys Phe
    50                  55                  60
```

```
Gln Gly Arg Val Thr Met Thr Ala Asp Thr Ser Asp Thr Ala Tyr
 65                  70                  75                  80

Met Asp Leu Ser Ser Leu Arg Ser Glu Asp Thr Ala Val Tyr Tyr Cys
                 85                  90                  95

Ala Thr Asp Leu Ala Gly Gly Ser Asp Phe Tyr Tyr Tyr Gly Leu Asp
            100                 105                 110

Val Trp Gly Gln Gly Thr Thr Val Thr Val Ser Ser
            115                 120
```

<210> SEQ ID NO 10
<211> LENGTH: 107
<212> TYPE: PRT
<213> ORGANISM: Homo sapiens

<400> SEQUENCE: 10

```
Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Ser Val Ser Ser Tyr
                 20                  25                  30

Leu Ala Trp Tyr Gln Gln Lys Pro Gly Gln Ala Pro Arg Leu Leu Ile
            35                  40                  45

Tyr Asp Ala Ser Asn Arg Ala Thr Gly Ile Pro Ala Arg Phe Ser Gly
 50                  55                  60

Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Arg Asn Asn Trp Pro Leu
                 85                  90                  95

Thr Phe Gly Gly Gly Thr Lys Val Glu Ile Lys
            100                 105
```

<210> SEQ ID NO 11
<211> LENGTH: 107
<212> TYPE: PRT
<213> ORGANISM: Homo sapiens

<400> SEQUENCE: 11

```
Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Ser Val Ser Ser Tyr
                 20                  25                  30

Leu Ala Trp Tyr Gln Gln Lys Pro Gly Gln Ala Pro Arg Leu Leu Ile
            35                  40                  45

Tyr Asp Ala Ser Asn Arg Ala Thr Gly Ile Pro Ala Arg Phe Ser Gly
 50                  55                  60

Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Arg Ser Asn Trp Pro Leu
                 85                  90                  95

Thr Phe Gly Gly Gly Thr Lys Val Glu Ile Lys
            100                 105
```

<210> SEQ ID NO 12
<211> LENGTH: 107
<212> TYPE: PRT
<213> ORGANISM: Homo sapiens

<400> SEQUENCE: 12

-continued

```
Ala Ile Gln Leu Thr Gln Ser Pro Ser Ser Leu Ser Ala Ser Val Gly
1               5                   10                  15

Asp Arg Val Thr Ile Thr Cys Arg Ala Ser Gln Gly Ile Ser Ser Ala
            20                  25                  30

Leu Ala Trp Tyr Gln Gln Lys Pro Gly Lys Ala Pro Lys Leu Leu Ile
            35                  40                  45

Tyr Asp Ala Ser Ser Leu Glu Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Phe Asn Ser Tyr Pro Tyr
                85                  90                  95

Thr Phe Gly Gln Gly Thr Lys Leu Glu Ile Lys
                100                 105
```

METHOD FOR THE REDUCTION OF HOST CELL PROTEINS IN AFFINITY CHROMATOGRAPHY

CROSS REFERENCE TO RELATED APPLICATIONS

This application is a continuation of U.S. patent application Ser. No. 15/900,461, filed Feb. 20, 2018, which is continuation of International Application No. PCT/EP2016/069604, filed Aug. 18, 2016, which claims priority to U.S. Provisional Application No. 62/208,523, filed Aug. 21, 2015, which are incorporated herein by reference in its entirety.

SEQUENCE LISTING

This application contains a Sequence Listing which has been submitted electronically in ASCII format and is hereby incorporated by reference in its entirety. Said ASCII copy, created on May 20, 2021, is named P32999-US-2-SeqListing.txt and is 13,369 bytes in size.

The present invention relates to the field of purification of polypeptides. The present invention in particular relates to the reduction of host cell proteins like phospholipase B-like 2 (PLBL2) or Clusterin in solutions containing antibodies.

BACKGROUND OF THE INVENTION

Proteins and especially immunoglobulins play an important role in today's medical portfolio. For human application every therapeutic protein has to meet distinct criteria. To ensure the safety of biopharmaceutical agents to humans by-products accumulating during the production process have to be removed especially. To fulfill the regulatory specifications one or more purification steps have to follow the manufacturing process. Among other things, purity, throughput, and yield play an important role in determining an appropriate purification process.

Different methods are well established and widespread used for protein purification, such as affinity chromatography (e.g. protein A or protein G affinity chromatography, single chain Fv ligand affinity chromatography), ion exchange chromatography (e.g. cation exchange (sulfopropyl or carboxymethyl resins), anion exchange (amino ethyl resins) and mixed-mode ion exchange), thiophilic adsorption (e.g. with beta-mercaptoethanol and other SH ligands), hydrophobic interaction or aromatic adsorption chromatography (e.g. with phenyl-sepharose, aza-arenophilic resins, or m-aminophenylboronic acid), metal chelate affinity chromatography (e.g. with Ni(II)- and Cu(II)-affinity material), size exclusion chromatography, and electrophoretical methods (such as gel electrophoresis, capillary electrophoresis).

For the purification of recombinantly produced immunoglobulins often a combination of different column chromatography steps is employed. During the purification non-immunoglobulin contaminants such as host cell protein and host cell DNA as well as endotoxins and viruses are depleted. Therefore, generally an affinity chromatography step, like protein A affinity chromatography is followed by one or more additional separation steps. In general, high conductivity buffers are described to be employed in wash steps of affinity chromatrography methods.

In U.S. Pat. No. 6,127,526 a method for purifying proteins by Protein A chromatography is described which comprises the steps of: (a) adsorbing the protein to Protein A immobilized on a solid phase comprising silica or glass; (b) removing contaminants bound to the solid phase by washing the solid phase with a hydrophobic electrolyte solvent; and (c) recovering the protein from the solid phase.

In WO2011/038894 a protein A chromatography method with a pronounced depletion of host cell protein and DNA by specific wash steps prior to the recovery of the immunoglobulin from the protein A chromatographic material is reported.

In WO2013/177118 compositions and methods for the isolation and purification of antibodies from a sample matrix are reported.

In WO2013/033517 methods for separating a polypeptide of interest (such as an antibody) from a virus are reported.

A method for purifying a protein, including one or more chromatographic processes, in which an amino acid; or a dipeptide, an oligopeptide, or a polyamino acid thereof is included in a buffer solution used in at least one chromatographic process (equilibration buffer, wash buffer, and elution buffer), thereby purifying a high-purity protein with a very small quantity of the impurity (e.g., polymers or host cell proteins) is reported in EP2583973.

SUMMARY OF THE INVENTION

Herein is reported a method for the production of an antibody with reduced content of host cell proteins by purifying the antibody with an affinity chromatography step.

In more detail it has been found that by the method of the current invention which uses a low conductivity aqueous solution in a wash step of an affinity chromatography prior to the recovery of an antibody from the chromatographic material, that the content of certain host cell proteins in a solution comprising the antibody can be reduced. Accordingly, it has been found that the content of phospholipases (in particular phospholipase B-like 2 (PLBL2)) can be reduced. It has been found that the PLBL2 content can be reduced 100-fold or more if the antibody is of the IgG4 isotype.

One aspect as reported herein is the use of a low conductivity aqueous solution in a wash step of a protein A chromatography for reducing the content of a host cell protein wherein the protein A chromatography is used to purify a human IgG1 or a human IgG4 isotype antibody.

In one embodiment of this aspect the human IgG4 isotype antibody is an antibody against P-selectin, or an bispecific antibody against factor IXa and factor X, or an antibody against IL-13, or an antibody against amyloid beta. In one embodiment of this aspect the human IgG1 isotype antibody is an antibody against Influenza B, or an antibody against VEGF-A, or an antibody against CD22, or a bispecific antibody against HER3 and EGFR, or an antibody against amyloid beta, or an antibody against Her2, or a bispecific antibody against Ang2 and VEGF-A, or a bispecific antibody against carcinoembryonic antigen (CEA) and CD3.

In one embodiment of this aspect the low conductivity aqueous solution has a conductivity value of about 0.5 mS/cm or less.

In one embodiment of this aspect the host cell protein is phospholipase B-like 2 (PLBL2) or Clusterin.

In one embodiment of this aspect the low conductivity aqueous solution comprises about 0.1 mM to about 8 mM Tris.

In one embodiment of this aspect the low conductivity aqueous solution comprises about 0.05 mM to about 2 mM potassium phosphate.

In one embodiment of this aspect the low conductivity aqueous solution has a pH of about 7 or higher.

In one embodiment of this aspect the low conductivity aqueous solution wash step is preceded or succeeded by a high conductivity aqueous solution wash step.

In one embodiment of this aspect the high conductivity aqueous solution has a conductivity value of about 20 mS/cm or higher.

In one embodiment of this aspect an intermediate wash step is performed with a medium conductivity aqueous solution between the low conductivity aqueous solution wash step and the high conductivity aqueous solution wash step.

In one embodiment of this aspect the medium conductivity aqueous solution has a conductivity value of from more than 0.5 mS/cm to less than 20 mS/cm.

In one embodiment of this aspect the high (or medium) conductivity aqueous solution comprises Histidine.

One aspect as reported herein is a method for producing a human IgG4 or IgG1 isotype antibody comprising the steps of
  a) cultivating a cell comprising a nucleic acid encoding a human IgG4 or IgG1 isotype antibody,
  b) recovering the human IgG4 or IgG1 isotype antibody from the cell or the cultivation medium,
  c) contacting the human IgG4 or IgG1 isotype antibody with a protein A chromatography material,
  d) washing the protein A chromatography material with a low conductivity aqueous solution,
  e) recovering the human IgG4 or IgG1 isotype antibody from the protein A chromatography material
  and thereby producing the human IgG4 or IgG1 isotype antibody.

One aspect as reported herein is method for purifying a human IgG4 or IgG1 isotype antibody from a sample comprising the steps of
  a) providing a sample comprising a human IgG4 or IgG1 isotype antibody,
  b) purifying the human IgG4 or IgG1 isotype antibody with a protein A chromatography method/step, comprising washing the protein A chromatography material with a low conductivity aqueous solution.

In one embodiment of all aspects the human IgG4 isotype antibody is an antibody against P-selectin or a bispecific antibody against factor IXa and factor X or an antibody against IL-13 or an antibody against amyloid beta. In one embodiment of all aspects the human IgG1 isotype antibody is an antibody against Influenza B or an antibody against VEGF-A or an antibody against CD22 or a bispecific antibody against HER3 and EGFR or an antibody against amyloid beta or an antibody against Her2 or a bispecific antibody against Ang2 and VEGF-A, or a bispecific antibody against carcinoembryonic antigen (CEA) and CD3.

In one embodiment of all aspects the low conductivity aqueous solution has a conductivity value of about 0.5 mS/cm or less.

In one embodiment of all aspects the content of a host cell protein is reduced and the (specific) host cell protein is phospholipase B-like 2 (PLBL2) or Clusterin.

In one embodiment of all aspects the low conductivity aqueous solution comprises about 0.1 mM to about 8 mM Tris.

In one embodiment of all aspects the low conductivity aqueous solution comprises about 0.05 mM to about 2 mM potassium phosphate.

In one embodiment of all aspects the low conductivity aqueous solution has a pH of about 7 or higher.

In one embodiment of all method aspects the method additionally comprises washing the affinity chromatography material with a high conductivity aqueous solution and/or with a medium conductivity aqueous solution before or after washing the protein A chromatography material with low conductivity aqueous solution.

In one embodiment of all aspects the high conductivity aqueous solution has a conductivity value of about 20 mS/cm or higher.

In one embodiment of all aspects the medium conductivity aqueous solution has a conductivity value of from more than 0.5 mS/cm to less than 20 mS/cm.

In one embodiment of all aspects the high or medium conductivity aqueous solution comprises Histidine.

DETAILED DESCRIPTION OF THE INVENTION

Herein is reported an improved affinity chromatography method and use comprising the washing of the affinity chromatography material with a low conductivity aqueous solution.

It has been found that specific host cell proteins can be reduced with a wash step with a low conductivity aqueous solution, when this wash step is used in an affinity chromatography step, e.g. a protein A chromatrography step. The affinity chromatography step is used in a purification or production method for antibodies. The low conductivity aqueous solution wash step is particularly effective to reduce the content of phospholipase B-like 2 (PLBL2).

One aspect as reported herein is the use of a low conductivity aqueous solution in a wash step of an affinity chromatography for reducing the content of a (specific) host cell protein.

One aspect as reported herein is a method for producing a human IgG isotype antibody comprising
  a) cultivating a cell comprising a nucleic acid encoding the human IgG isotype antibody,
  b) recovering the human IgG isotype antibody from the cell or the cultivation medium,
  c) contacting (a solution comprising) the human IgG isotype antibody with an affinity chromatography material,
  d) washing the affinity chromatography material with a low conductivity aqueous solution, while at least 90% the bispecific antibody remains bound to the affinity chromatography material,
  e) recovering the human IgG isotype antibody from affinity chromatography material
  and thereby producing the human IgG isotype antibody.

One aspect as reported herein is a method for purifying a human IgG isotype antibody from a sample comprising the steps of
  a) providing a (buffered aqueous) sample comprising a human IgG isotype antibody,
  b) purifying the human IgG isotype antibody with a affinity chromatography method/step, comprising washing the affinity chromatography material with low conductivity aqueous solution.

Recombinant polypeptides produced in CHO cells may be purified according to the methods described herein to remove or reduce levels of a host cell proteins.

Exemplary recombinant polypeptides include therapeutic antibodies and immunoadhesins, including, without limitation, antibodies, including antibody fragments, to one or more of the following antigens: HER1 (EGFR), HER2 (e.g., trastuzumab, pertuzumab), HER3, HER4, VEGF (e.g., bevacizumab, ranibizumab), MET (e.g., onartuzumab), CD20 (e.g., rituximab, obinutuzumab, ocrelizumab), CD22, CD11a, CD11b, CD11c, CD18, an ICAM, VLA-4, VCAM, IL-17A and/or F, IgE (e.g., omalizumab), DR5, CD40, Apo2L/TRAIL, EGFL7 (e.g., parsatuzumab), NRP1, integrin beta? (e.g., etrolizumab), IL-13 (e.g., lebrikizumab), Abeta (e.g., crenezumab, gantenerumab), P-selectin (e.g., inclacumab), IL-6R (e.g., tociluzumab), IFNa (e.g., rontalizumab), M1prime (e.g., quilizumab), mitogen activated protein kinase (MAPK), OX40L, TSLP, Factor D (e.g., lampalizumab) and receptors such as: IL-9 receptor, IL-5 receptor, IL-4receptor alpha, IL-13receptoralpha1 and IL-13receptoralpha2, OX40, TSLP-R, IL-7R alpha (a co-receptor for TSLP), IL17RB (receptor for IL-25), ST2 (receptor for IL-33), CCR3, CCR4, CRTH2, FcepsilonRI and FcepsilonRII/CD23 (receptors for IgE). Other exemplary antibodies include those selected from, and without limitation, antiestrogen receptor antibody, anti-progesterone receptor antibody, anti-p53 antibody, anticathepsin D antibody, antiBcl-2 antibody, anti-E-cadherin antibody, anti-CA125 antibody, anti-CA15-3 antibody, antiCA19-9 antibody, anti-c-erbB-2 antibody, anti-P-glycoprotein antibody, anti-CEA antibody, Ki-67 antibody, anti-PCNA antibody, anti-CD3 antibody, anti-CD4 antibody, anti-CD5 antibody, anti-CD7 antibody, anti-CD8 antibody, anti-CD9/p24 antibody, anti-CD10 antibody, anti-CD11c antibody, anti-CD13 antibody, anti-CD14 antibody, anti-CD15 antibody, anti-CD19 antibody, anti-CD23 antibody, anti-CD30 antibody, anti-CD31 antibody, anti-CD33 antibody, anti-CD34 antibody, anti-CD35 antibody, anti-CD38 antibody, anti-CD41 antibody, antiLCA/CD45 antibody, anti-CD45RO antibody, anti-CD45RA antibody, anti-CD39 antibody, anti-CD100 antibody, anti-CD95/Fas antibody, anti-CD99 antibody, anti-CD106 antibody, antiubiquitin antibody, anti-CD71 antibody, anti-c-myc antibody, anti-cytokeratins antibody, anti-vimentins antibody, anti-HPV proteins antibody, anti-kappa light chains antibody, anti-lambda light chains antibody, anti-melanosomes antibody, anti-prostate specific antigen antibody, antiS-100 antibody, anti-tau antigen antibody, anti-fibrin antibody, anti-keratins antibody and antiTn-antigen antibody.

In some embodiments, exemplary antibodies include antibodies to Abeta, antibodies to IL17 A/F and antibodies to CMV. Exemplary anti-Abeta antibodies and methods of producing such antibodies have been described previously, for example, in WO2008011348, WO2007068429, WO2001062801, and WO2004071408. Exemplary anti-IL17 A/F antibodies and methods of producing such antibodies have been described previously, for example, in WO 2009136286 and U.S. Pat. No. 8,715,669. Exemplary anti-CMV antibodies, including anti-CMV-MSL, and methods of producing such antibodies have been described previously, for example, in WO 2012047732.

In some embodiments the affinity chromatography is used to purify a human IgG isotype antibody. In some embodiments the affinity chromatography is used to purify an IgG4 antibody. In one embodiment the IgG4 isotype antibody is an antibody against P-selectin or a (bispecific) antibody against factor IXa and factor X or an antibody against IL-13 or an antibody against amyloid beta. In some embodiments the affinity chromatography is used to purify an IgG1 isotype antibody. In one embodiment the IgG1 isotype antibody is an antibody against Influenza B or an antibody against VEGF-A or an antibody against CD22 or an (bispecific) antibody against HER3 and EGFR or an antibody against amyloid beta or an antibody against Her2 or a bispecific antibody against Ang2 and VEGF-A or a bispecific antibody against carcinoembryonic antigen (CEA) and CD3.

One aspect as reported herein is a method for producing a human IgG4 isotype antibody (containing solution) comprising
a) cultivating a cell comprising a nucleic acid encoding a human IgG4 isotype antibody,
b) recovering the human IgG4 isotype antibody from the cell or the cultivation medium,
c) contacting the human IgG4 isotype antibody with an affinity chromatography material,
d) washing the affinity chromatography material with a low conductivity aqueous solution,
e) recovering the human IgG4 isotype antibody from the affinity chromatography material
and thereby producing the human IgG4 isotype antibody.

One aspect as reported herein is a method for producing an IgG4 isotype antibody (containing solution) comprising
a) cultivating a cell comprising a nucleic acid encoding an IgG4 isotype antibody,
b) recovering the IgG4 isotype antibody from the cell or the cultivation medium,
c) contacting the IgG4 isotype antibody with an affinity chromatography material,
d) washing the affinity chromatography material with a low conductivity aqueous solution,
e) recovering the IgG4 isotype antibody from the affinity chromatography material
and thereby producing the IgG4 isotype antibody.

One aspect as reported herein is a method for purifying a human IgG4 isotype antibody from a sample comprising the steps of
a) providing a sample comprising a human IgG4 isotype antibody,
b) purifying the human IgG4 isotype antibody with a affinity chromatography method/step, comprising washing the affinity chromatography material with a low conductivity aqueous solution.

One aspect as reported herein is a method for purifying an IgG4 isotype antibody from a sample comprising the steps of
a) providing a sample comprising an IgG4 isotype antibody,
b) purifying the IgG4 isotype antibody with a affinity chromatography method/step, comprising washing the affinity chromatography material with a low conductivity aqueous solution.

It has been found that the content of a host cell protein can be reduced if the conductivity of the aqueous solution used in the wash step is low i.e a low conductivity aqueous solution is used for washing. In one embodiment of all aspects the low conductivity aqueous solution has a conductivity value of about 1 mS/cm or less. In one preferred embodiment of all aspects the low conductivity aqueous solution has a conductivity value of about 0.5 mS/cm or less. In one embodiment the low conductivity aqueous solution has a conductivity value of from about 0.03 µS/cm to about 0.5 mS/cm. In one embodiment the low conductivity aqueous solution has a conductivity value of from about 0.05 µS/cm to about 0.35 mS/cm. In one embodiment of all aspects the low conductivity aqueous solution is deionized water. For some applications deionized water is not suitable to be used in a wash step. In some embodiments the low conductivity aqueous solution is not deionized water.

It has been found that a protein A affinity chromatography can be used for the purposes as reported herein. In one preferred embodiment of all aspects the affinity chromatography is a protein A affinity chromatography. In one embodiment the protein A affinity chromatography is selected from the group comprising MabSelectSure affinity chromatography, ProSep vA affinity chromatography, Poros Mab Capture A affinity chromatography, ProSep Ultra Plus affinity chromatography, MabSelect SuRe LX, MabSelect, Eshmuno A, Toyopearl AF-rProtein A-650F; Toyopearl AF-rProtein A HC-650HF). In one embodiment the affinity chromatography is a protein G affinity chromatography. In one embodiment the affinity chromatography is an affinity chromatography that uses a recombinant protein as a ligand, that means that the affinity chromatography is a recombinant protein ligand affinity chromatography. In one embodiment the affinity chromatography is an affinity chromatography that uses a single chain Fv as a ligand, that means that the affinity chromatography is a single chain Fv ligand affinity chromatography. In one embodiment the affinity chromatography comprises a mutated Protein A coupled to a chromatography matrix or a fragment of Protein A coupled to a chromatography matrix.

It has been found that the content of (specific) host cell proteins can be reduced. It has been found that especially the content of phospholipase B-like 2 (PLBL2) can be reduced. In one embodiment the (specific) host cell protein is a Chinese hamster ovary (CHO) host cell protein. In one preferred embodiment of all aspects the (specific) host cell protein is phospholipase B-like 2 (PLBL2) or Clusterin. In one embodiment the (specific) host cell protein is phospholipase B-like 2 (PLBL2).

It has been found that low conductivity aqueous solution may comprise certain buffering substances e.g. Tris or potassium phosphate in low amounts. In one embodiment the low conductivity aqueous solution contains tris(hydroxymethyl)aminomethane (Tris). In one embodiment the low conductivity aqueous solution comprises about 0.1 mM to about 10 mM Tris. In one embodiment the low conductivity aqueous solution comprises about 0.5 mM to about 6.5 mM Tris. In one embodiment the low conductivity aqueous solution comprises about 2 mM Tris. In one embodiment the low conductivity aqueous solution contains potassium phosphate. In one embodiment the low conductivity aqueous solution comprises about 0.05 mM to about 5 mM potassium phosphate. In one embodiment the low conductivity aqueous solution comprises about 0.05 mM to about 2 mM potassium phosphate. In one embodiment the low conductivity aqueous solution comprises about 0.5 mM potassium phosphate.

It has been found that the effect of reducing the content of a host cell protein is pronounced if the low conductivity aqueous solution has a certain pH. In one embodiment the low conductivity aqueous solution has a pH of about 7 or higher. In one embodiment the low conductivity aqueous solution has a pH of about 7.5 or higher. In one embodiment the low conductivity aqueous solution has a pH of from about 7 to about 9.5. In one embodiment the low conductivity aqueous solution has a pH of from about 7.5 to about 8.5. In one embodiment the low conductivity aqueous solution has a pH of about 8. In one embodiment the low conductivity aqueous solution has a pH of about 9.

It has been found that the effect of reducing the content of a host cell protein can also be achieved if the pH of the low conductivity aqueous solution is about 8.5 or higher and the low conductivity aqueous solution has a conductivity value of about 1.2 mS/cm or less. In one embodiment the low conductivity aqueous solution has a pH of about 8.5 or higher and the low conductivity aqueous solution has a conductivity value of about 1.2 mS/cm or less. In one embodiment the low conductivity aqueous solution has a pH of about 8.5 or higher and the low conductivity aqueous solution has a conductivity value of about 1 mS/cm or less. In one embodiment low conductivity aqueous solution has a pH of about 8.5 or higher and the low conductivity aqueous solution comprises about 55 mM Tris or less. In one embodiment low conductivity aqueous solution has a pH of about 8.5 or higher and the low conductivity aqueous solution comprises about 30 mM Tris or less.

In one embodiment the low conductivity aqueous solution is in the pH range of from pH 7 to less than pH 8.5 and has a conductivity value of about 0.5 mS/cm or less and at a pH value of 8.5 or more a conductivity value of about 1.2 mS/cm or less.

It has been found that by the uses and the methods as reported herein the content of host cell proteins like PLBL2 can be reduced to a certain level, e.g. when compared to the load amount of PLBL2 prior to a purification step like an affinity chromatography step. In one embodiment the content of PLBL2 is reduced at least 20-fold. In one embodiment the content of PLBL2 is reduced at least 40-fold. In one embodiment the content of PLBL2 is reduced at least 50-fold. In one embodiment the content of PLBL2 is reduced at least 90-fold. In one embodiment the content of PLBL2 is reduced at least 100-fold. In some cases the level of reduction is even higher. In some embodiments the content of PLBL2 is reduced at least 200-fold. In some embodiments the content of PLBL2 is reduced at least 250-fold. In some embodiments the content of PLBL2 is reduced at least 300-fold. In some embodiments the content of PLBL2 is reduced at least 400-fold. In some embodiments the content of PLBL2 is reduced at least 1000-fold. In one embodiment the content of PLBL2 is reduced at least by 50%. In one embodiment the content of PLBL2 is reduced at least by 66%. In one embodiment the content of PLBL2 is reduced at least by 80%. In one embodiment the content of PLBL2 is reduced at least by 90%. In one embodiment the content of PLBL2 is reduced at least by 95%. In some embodiments the content of PLBL2 is reduced to below 10 ng per mg of antibody. In some embodiments the content of PLBL2 is reduced to below 5 ng per mg of antibody. In some embodiments the content of PLBL2 is reduced to below 2 ng per mg of antibody.

In the methods and the uses as reported herein further wash steps can be employed with medium and/or high conductivity aqueous solutions. In one embodiment the low conductivity aqueous solution wash step is preceded or succeeded by a high conductivity aqueous solution wash step. In one embodiment the high conductivity aqueous solution has a conductivity value of about 20 mS/cm or higher. In one embodiment the high conductivity aqueous solution has a conductivity value of from about 20 mS/cm to about 100 mS/cm. In one embodiment an intermediate wash step is performed with a medium conductivity aqueous solution between the low conductivity aqueous solution wash step and the high conductivity aqueous solution wash step. In one embodiment the medium conductivity aqueous solution has a conductivity value of from more than 0.5 mS/cm to less than 20 mS/cm.

It has been found that the host cell protein reducing effect can be improved when the high or medium conductivity aqueous solution further comprises an amino acid. In one embodiment the high or medium conductivity aqueous solution comprises an amino acid. In one embodiment the high or medium conductivity aqueous solution comprises Histidine or Arginine. In one embodiment the high or medium conductivity aqueous solution comprises Histidine. In one embodiment the high or medium conductivity aqueous solution comprises Histidine and Tris.

The methods and the uses as reported herein may include one or more further chromatography steps. In one embodiment at least one additional chromatography method/step is performed. In one embodiment an additional ion exchange chromatography method/step is performed. In one embodiment an additional anion exchange chromatography method/step is performed. In one embodiment an additional anion exchange chromatography method/step and an additional cation exchange chromatography method/step are performed.

It has been found that the use of a hydrophobic interaction chromatography step may be omitted. In one embodiment the use or the methods is without an hydrophobic interaction chromatography method/step.

One aspect as reported herein is the use of a low conductivity aqueous solution in a wash step of a protein A chromatography for reducing the content of PLBL2 or Clusterin wherein the protein A chromatography is used to purify an IgG4 or IgG1 isotype, e.g., a human IgG4 or IgG1, antibody and wherein the low conductivity aqueous solution has a conductivity value of about 0.5 mS/cm or less and a pH of about 7 or higher.

One aspect is the use of a low conductivity aqueous solution in a wash step of a protein A chromatography for reducing the content of PLBL2 or Clusterin wherein the protein A chromatography is used to purify a human IgG4 or IgG1 isotype antibody and wherein the low conductivity aqueous solution has a conductivity value of about 0.5 mS/cm or less and a pH of about 7 or higher. In some embodiments, the antibody is an IgG4 isotype antibody, e.g., an antibody against P-selectin, or a bispecific antibody against factor IXa and factor X, or an antibody against IL-13, or an antibody against amyloid beta. In some embodiments, the antibody is a IgG1 isotype antibody, e.g., an antibody against Influenza B, or an antibody against VEGF-A, or an antibody against CD22, or a bispecific antibody against HER3 and EGFR, or an antibody against amyloid beta, or an antibody against Her2, or a bispecific antibody against Ang2 and VEGF-A, or a bispecific antibody against carcinoembryonic antigen (CEA) and CD3.

In an aspect, the present disclosure provides a method for producing a human IgG4 or IgG1 isotype antibody comprising
  a) cultivating a cell comprising a nucleic acid encoding the human IgG4 or IgG1 isotype antibody,
  b) recovering the human IgG4 or IgG1 isotype antibody from the cell or the cultivation medium,
  c) contacting the human IgG4 or IgG1 isotype antibody with a protein A affinity chromatography material,
  d) washing the protein A affinity chromatography material with a low conductivity aqueous solution,
  e) recovering the human IgG4 or IgG1 isotype antibody from affinity chromatography material
  and thereby producing the human IgG4 or IgG1 isotype antibody,
  wherein the low conductivity aqueous solution has a conductivity value of about 0.5 mS/cm or less and a pH of about 7 or higher.

In an aspect, the present disclosure provides a method for producing a human IgG4 or IgG1 isotype antibody comprising
  a) cultivating a cell comprising a nucleic acid encoding the human IgG4 or IgG1 isotype antibody,
  b) recovering the human IgG4 or IgG1 isotype antibody from the cell or the cultivation medium,
  c) contacting the human IgG4 or IgG1 isotype antibody with a protein A affinity chromatography material,
  d) washing the protein A affinity chromatography material with a low conductivity aqueous solution,
  e) recovering the human IgG4 or IgG1 isotype antibody from affinity chromatography material
  and thereby producing the human IgG4 or IgG1 isotype antibody,
  wherein the low conductivity aqueous solution has a conductivity value of about 0.5 mS/cm or less and a pH of about 7 or higher,
  and wherein the human IgG4 isotype antibody is an antibody against P-selectin, or a bispecific antibody against factor IXa and factor X, or an antibody against IL-13, or an antibody against amyloid beta and wherein the human IgG1 isotype antibody is an antibody against Influenza B, or an antibody against VEGF-A, or an antibody against CD22, or a bispecific antibody against HER3 and EGFR, or an antibody against amyloid beta, or an antibody against Her2, or a bispecific antibody against Ang2 and VEGF-A, or a bispecific antibody against carcinoembryonic antigen (CEA) and CD3.

In an aspect, the present disclosure provides a method for purifying a human IgG4 or IgG1 isotype antibody from a sample comprising the steps of
  a) providing a sample comprising a human IgG4 or IgG1 isotype antibody,
  b) purifying the human IgG4 or IgG1 isotype antibody with a protein A affinity chromatography method/step, comprising washing the protein A affinity chromatography material with low conductivity aqueous solution,
  wherein the low conductivity aqueous solution has a conductivity value of about 0.5 mS/cm or less and a pH of about 7 or higher.

In an aspect, the present disclosure provides a method for purifying a human IgG4 or IgG1 isotype antibody from a sample comprising the steps of
  a) providing a sample comprising a human IgG4 or IgG1 isotype antibody,
  b) purifying the human IgG4 or IgG1 isotype antibody with a protein A affinity chromatography method/step, comprising washing the protein A affinity chromatography material with low conductivity aqueous solution,
  wherein the low conductivity aqueous solution has a conductivity value of about 0.5 mS/cm or less and a pH of about 7 or higher,
  and wherein the human IgG4 isotype antibody is an antibody against P-selectin, or an antibody against factor IXa and factor X, or an antibody against IL-13, or an antibody against amyloid beta and wherein the human IgG1 isotype antibody is an antibody against Influenza B, or an antibody against VEGF-A, or an antibody against CD22, or a antibody against HER3 and EGFR, or an antibody against amyloid beta, or an antibody against Her2, or a bispecific antibody against Ang2 and VEGF-A, or a bispecific antibody against carcinoembryonic antigen (CEA) and CD3.

In an aspect, the present disclosure provides a method for producing a human IgG4 isotype antibody comprising
  a) cultivating a cell comprising a nucleic acid encoding the human IgG4 isotype antibody,
  b) recovering the human IgG4 isotype antibody from the cell or the cultivation medium,
  c) contacting the human IgG4 isotype antibody with a protein A affinity chromatography material,
  d) washing the protein A affinity chromatography material with a low conductivity aqueous solution,
  e) recovering the human IgG4 isotype antibody from affinity chromatography material and thereby producing the human IgG4 isotype antibody,
wherein the low conductivity aqueous solution has a
conductivity value of about 0.5 mS/cm or less and a pH
of about 7 or higher, and wherein the human IgG4
isotype antibody is antibody against factor IXa and
factor X.

In an aspect, the present disclosure provides a method for purifying a human IgG4 isotype antibody from a sample comprising the steps of
a) providing a sample comprising a human IgG4 isotype antibody,
b) purifying the human IgG4 isotype antibody with a protein A affinity chromatography method/step, comprising washing the protein A affinity chromatography material with low conductivity aqueous solution,
wherein the low conductivity aqueous solution has a conductivity value of about 0.5 mS/cm or less and a pH of about 7 or higher,
and wherein the human IgG4 isotype antibody is an antibody against factor IXa and factor X.

The terms "anti-P-selectin antibody" and "an antibody that binds to P-selectin" or "antibody against P-selectin" refer to an antibody that is capable of binding P-selectin with sufficient affinity such that the antibody is useful as a diagnostic and/or therapeutic agent in targeting P-selectin. In one embodiment, the extent of binding of an anti-P-selectin antibody to an unrelated, non-P-selectin protein is less than about 10% of the binding of the antibody to P-selectin as measured, e.g., by ELISA or surface plasmon resonance. In certain embodiments, an anti-P-selectin antibody binds to an epitope of P-selectin that is conserved among P-selectin from different species. The above also holds for the terms "antibody against factor IXa and factor X" or "antibody against IL-13" or "antibody against amyloid beta" or the like.

In some embodiments, the antibody against P-selectin is inclacumab (IgG4 isotype) as described in WO 2005/100402 or SEQ ID NO: 07 to 12. In some embodiments, the antibody is a bispecific antibody against factor IXa and factor X, e.g., anti-FIXa/X antibody (IgG4 isotype) as described in WO 2012/067176. In some embodiments, the antibody is an antibody against Her2, e.g., trastuzumab (IgG1 isotype) as described in WO 1992/022653. In some embodiments, the antibody is a bispecific antibody against angiopoietin 2 (Ang2) and vascular endothelial growth factor A (VEGF-A), e.g., vanucizumab (IgG1 isotype) as described in WO 2011/117329 or SEQ ID NO: 01 to 04. In some embodiments, the antibody is an antibody against amyloid beta, e.g., gantenerumab (IgG1 isotype) as described in WO 2003/070760 or SEQ ID NO: 05 to 06, or crenezumab (IgG4 isotype). In some embodiments, the antibody is an antibody against CD22, an antibody against IL13 (e.g., lebrikizumab), a bispecific antibody against Her3 and EGFR (e.g., duligotuzumab), an antibody against VEGF-A (e.g., bevacizumab), and an antibody against Influenza B. The terms VEGF or VEGF-A can be used interchangeably herein.

As used herein, the term "binding" or "specifically binding" refers to the binding of the antibody to an epitope of the antigen in an in-vitro assay, preferably in a surface plasmon resonance assay (SPR, BIAcore, GE-Healthcare Uppsala, Sweden). The affinity of the binding is defined by the terms ka (rate constant for the association of the antibody from the antibody/antigen complex), $k_d$ (dissociation constant), and $K_D$ ($k_d/k_a$). Binding or specifically binding means a binding affinity ($K_D$) of $10^{-7}$ mol/L or less.

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')$_2$; diabodies; linear antibodies; single-chain antibody molecules (e.g. scFv); and multispecific antibodies formed from antibody fragments. A Fab fragment is an antibody fragment obtained by a papain digestion of a (full length/complete) antibody.

Bispecific antibodies" are antibodies which have two different antigen-binding specificities. The term "bispecific" antibody as used herein denotes an antibody that has at least two binding sites each of which bind to different epitopes.

The term "chimeric" antibody refers to an antibody in which a portion of the heavy and/or light chain is derived from a particular source or species, while the remainder of the heavy and/or light chain is derived from a different source or species.

The "class" of an antibody refers to the type of constant domain or constant region possessed by its heavy chain. There are five major classes of antibodies: IgA, IgD, IgE, IgG, and IgM, and several of these may be further divided into subclasses (isotypes), e.g., IgG$_1$, IgG$_2$, IgG$_3$, IgG$_4$, IgA$_1$, and IgA$_2$. The heavy chain constant domains that correspond to the different classes of immunoglobulins are called α, δ, ε, γ, and μ, respectively.

The term "human IgG isotype antibody" denotes an antibody that comprises a constant region that is derived from a human wild-type IgG isotype, i.e. for example it may comprise a constant region derived from a human IgG isotype with a mutation, e.g. an P329G mutation (numbering according to Kabat).

The term "human IgG4 isotype antibody" denotes an antibody that comprises a constant region that is derived from a human wild-type IgG4 isotype, i.e. for example it may comprise a constant region derived from a human IgG4 isotype with a mutation, e.g. an P329G mutation and/or S228P, L235E mutation (numbering according to Kabat).

The term "Fc-region" herein is used to define a C-terminal region of an immunoglobulin heavy chain that contains at least a portion of the constant region. The term includes native sequence Fc-regions and variant Fc-regions. In one embodiment, a human IgG heavy chain Fc-region extends from Cys226, or from Pro230, to the carboxyl-terminus of the heavy chain. However, the C-terminal lysine (Lys447) or the C-terminal glycyl-lysine dipeptide (Gly446Lys447) of the Fc-region may or may not be present. Unless otherwise specified herein, numbering of amino acid residues in the Fc-region or constant region is according to the EU numbering system, also called the EU index, as described in Kabat, E. A. et al., Sequences of Proteins of Immunological Interest, 5th ed., Public Health Service, National Institutes of Health, Bethesda, MD (1991), NIH Publication 91-3242.

"Framework" or "FR" refers to variable domain residues other than hypervariable region (HVR) residues. The FR of a variable domain generally consists of four FR domains: FR1, FR2, FR3, and FR4. Accordingly, the HVR and FR sequences generally appear in the following sequence in VH (or VL): FR1-H1(L1)-FR2-H2(L2)-FR3-H3(L3)-FR4.

The terms "host cell", "host cell line", and "host cell culture" are used interchangeably and refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein. The term "cell" includes cells which are used for the expression of nucleic acids. In one embodiment the host cell is a CHO cell (e.g. CHO K1, CHO DG44), or a BHK cell, or a NS0 cell, or a SP2/0 cell, or a HEK 293 cell, or a HEK 293 EBNA cell, or a PER.C6® cell, or a COS cells. In another embodiment the cell is a CHO cell, or a BHK cell, or a PER.C6® cell. As used herein, the expression "cell" includes the subject cell and its progeny.

The term "washing" denotes the applying of a solution to an affinity chromatography material in order to remove non specifically bound polypeptides and non-polypeptide compounds from the chromatography material, especially to remove host cell protein and host cell DNA. The term "washing" does not encompass the elution of bound material from an affinity chromatography material.

Different methods are well established and widespread used for protein recovery and purification, such as affinity chromatography with microbial proteins (e.g. protein A or protein G affinity chromatography) affinity chromatographie with a recombinant protein as ligand (e.g. single chain Fv as ligand, e.g. Kappa select), ion exchange chromatography (e.g. cation exchange (carboxymethyl resins), anion exchange (amino ethyl resins) and mixed-mode exchange), thiophilic adsorption (e.g. with beta-mercaptoethanol and other SH ligands), hydrophobic interaction or aromatic adsorption chromatography (e.g. with phenyl-sepharose, aza-arenophilic resins, or m-aminophenylboronic acid), metal chelate affinity chromatography (e.g. with Ni(II)- and Cu(II)-affinity material), size exclusion chromatography, and electrophoretical methods (such as gel electrophoresis, capillary electrophoresis). These methods can be combined independently in different embodiments as reported herein.

The term "protein A" denotes a protein A polypeptide either obtained from a natural source or produced synthetically.

The term "protein A chromatography material" denotes an inert solid phase to which a protein A is covalently linked.

In one embodiment the protein A chromatography material is selected from MabSelectSure, ProSep vA, Mab Capture A, ProSep Ultra Plus, Mab Select, Mab Select Xtra, Poros A, or ProSep A.

The term "high conductivity aqueous solution" denotes an aqueous solution with a high conductivity value. The conductivity value may be about 20 mS/cm or higher.

The term "medium conductivity aqueous solution" denotes an aqueous solution with a medium conductivity value. The conductivity value may be more than 0.5 mS/cm to less than 20 mS/cm.

The term "low conductivity aqueous solution" denotes an aqueous solution with a low conductivity value. The conductivity value may be about 0.5 mS/cm or less. The conductivity value may be about 1.2 mS/cm or less, if the pH is about 8.5 or higher. The conductivity values can be determined by standard methods known to the person skilled in the art.

The following examples and sequences are provided to aid the understanding of the present invention, the true scope of which is set forth in the appended claims. It is understood that modifications can be made in the procedures set forth without departing from the spirit of the invention.

Specific Embodiments of the Invention

1. Use of a low conductivity aqueous solution in a wash step of an affinity chromatography for reducing the content of a host cell protein.

2. Use according to embodiment 1, wherein the affinity chromatography is used to purify a human IgG isotype antibody.

3. Use according to embodiment 2, wherein the affinity chromatography is used to purify a human IgG4 isotype antibody or a human IgG1 isotype antibody.

4. Use according to embodiment 3, wherein the affinity chromatography is used to purify a human IgG4 isotype antibody or a human IgG1 isotype antibody without a glycosylated glycosylation site in its Fab fragment/with exactly one glycosylation site (at position Asn 297 numbering according to Kabat).

5. Use according to embodiment 4, wherein the low conductivity aqueous solution has a conductivity value of about 0.5 mS/cm or less.

6. Use according to embodiment 5, wherein the low conductivity aqueous solution has a conductivity value of from about 0.03 µS/cm to about 0.5 mS/cm.

7. Use according to embodiment 5, wherein the low conductivity aqueous solution has a conductivity value of from about 0.05 µS/cm to about 0.35 mS/cm.

8. Use according to any of embodiments 5 to 7, wherein the low conductivity aqueous solution is not deionized water.

9. Use according to any of the previous embodiments, wherein the affinity chromatography is a protein A affinity chromatography or a Protein G affinity chromatography or a single chain Fv ligand (KappaSelect) affinity chromatography.

10. Use according to embodiment 9, wherein the affinity chromatography is a protein A affinity chromatography.

11. Use according to embodiment 10, wherein the protein A affinity chromatography is selected from the group comprising MabSelectSure affinity chromatography, ProSep vA affinity chromatography, Poros Mab Capture A affinity chromatography, ProSep Ultra Plus affinity chromatography, MabSelect SuRe LX, MabSelect, Eshmuno A, Toyopearl AF-rProtein A-650F; Toyopearl AF-rProtein A HC-650HF).

12. Use according to any one of the previous embodiments, wherein said host cell protein is a Chinese hamster ovary (CHO) host cell protein.

13. Use according to embodiment 12, wherein the host cell protein is a phospholipase.

14. Use according to embodiment 13, wherein the host cell protein is a phospholipase A, phospholipase B, phospholipase C or phospholipase D.

15. Use according to embodiments 12, 13 or 14, wherein the host cell protein is phospholipase B-like 2 (PLBL2).

16. Use according to embodiment 12, wherein the host cell protein is phospholipase B-like 2 (PLBL2) or Clusterin.

17. Use according to any of the preceding embodiments, wherein the low conductivity aqueous solution contains tris(hydroxymethyl)aminomethane (Tris).

18. Use according to embodiment 17, wherein the low conductivity aqueous solution comprises about 0.1 mM to about 10 mM Tris.

19. Use according to embodiment 18, wherein the low conductivity aqueous solution comprises about 0.1 mM to about 8 mM Tris.

20. Use according to embodiment 19, wherein the low conductivity aqueous solution comprises about 0.5 mM to about 6.5 mM Tris.

21. Use according to embodiment 20, wherein the low conductivity aqueous solution comprises about 2 mM Tris.

22. Use according to any one of embodiments 17 to 21, wherein the low conductivity aqueous solution contains potassium phosphate.

23. Use according to embodiment 22, wherein the low conductivity aqueous solution comprises about 0.05 mM to about 5 mM potassium phosphate.

24. Use according to embodiment 23, wherein the low conductivity aqueous solution comprises about 0.05 mM to about 2 mM potassium phosphate.

25. Use according to embodiment 24, wherein the low conductivity aqueous solution comprises about 0.5 mM potassium phosphate.

26. Use according to any of the preceeding embodiments, wherein the low conductivity aqueous solution has a pH of about 7 or higher.

27. Use according to embodiment 26, wherein the low conductivity aqueous solution has a pH of about 7.5 or higher.

28. Use according to embodiment 27, wherein the low conductivity aqueous solution has a pH of from about 7 to about 9.5.

29. Use according to embodiment 28, wherein the low conductivity aqueous solution has a pH of from about 7.5 to about 8.5.

30. Use according to embodiment 29, wherein the low conductivity aqueous solution has a pH of about 8.

31. Use according to any one of the preceeding embodiments, wherein the low conductivity aqueous solution wash step is preceded or succeeded by a high conductivity aqueous solution wash step.

32. Use according to embodiment 31, wherein the low conductivity aqueous solution wash step is preceded by a high conductivity aqueous solution wash step.

33. Use according to embodiment 31, wherein the high conductivity aqueous solution has a conductivity value of about 20 mS/cm or higher.

34. Use according to embodiment 33, wherein the high conductivity aqueous solution has a conductivity value of from about 20 mS/cm to about 100 mS/cm.

35. Use according to embodiment 31, wherein an intermediate wash step is performed with a medium conductivity aqueous solution between the low conductivity aqueous solution wash step and the high conductivity aqueous solution wash step.

36. Use according to embodiment 35, wherein the medium conductivity aqueous solution has a conductivity value of from more than 0.5 mS/cm to less than 20 mS/cm.

37. Use according to any one of embodiments 33 to 36, wherein the high or medium conductivity aqueous solution comprises an amino acid.

38. Use according to embodiment 37, wherein the high or medium conductivity aqueous solution comprises Histidine.

39. Use according to embodiment 37, wherein the high or medium conductivity aqueous solution comprises Histidine and Tris.

40. Use according to any of the preceeding embodiments, wherein at least one additional chromatography method/step is performed.

41. Use according to embodiment 40, wherein an additional ion exchange chromatography method/step is performed.

42. Use according to embodiment 41, wherein an additional anion exchange chromatography method/step is performed.

43. Use according to embodiment 40, wherein an additional cation exchange chromatography method/step is performed.

44. Use according to embodiment 40, wherein an additional anion exchange chromatography method/step and an additional cation exchange chromatography method/step are performed.

45. Use according to embodiment 40, wherein the use is without a hydrophobic interaction chromatography method/step.

46. Use according to any of the preceeding embodiments, wherein the human IgG4 isotype antibody is an antibody against P-selectin or an antibody against factor IXa and factor X or an antibody against IL-13 or an antibody against amyloid beta.

47. Use according to embodiments 1 to 45, wherein the human IgG1 isotype antibody is an antibody against Influenza B or an antibody against VEGF-A or an antibody against CD22 or an antibody against HER3 and EGFR or an antibody against amyloid beta or an antibody against Her2 or an antibody against Ang2 and VEGF-A or an antibody against carcinoembryonic antigen (CEA) and CD3.

48. Method for producing a human IgG isotype antibody comprising
   a) cultivating a cell comprising a nucleic acid encoding the human IgG isotype antibody,
   b) recovering the human IgG isotype antibody from the cell or the cultivation medium,
   c) contacting the human IgG isotype antibody with an affinity chromatography material,
   d) washing the affinity chromatography material with a low conductivity aqueous solution
   e) recovering the human IgG isotype antibody from affinity chromatography material and thereby producing the human IgG isotype antibody.

49. Method for producing a human IgG4 isotype antibody comprising
   a) cultivating a cell comprising a nucleic acid encoding a human IgG4 isotype antibody,
   b) recovering the human IgG4 isotype antibody from the cell or the cultivation medium,
   c) contacting the human IgG4 isotype antibody with an affinity chromatography material,
   d) washing the affinity chromatography material with a low conductivity aqueous solution
   e) recovering the human IgG4 isotype antibody from the affinity chromatography material
   and thereby producing the human IgG4 isotype antibody.

50. Method according to embodiment 48, wherein the human IgG isotype antibody is a human IgG4 isotype antibody or a human IgG1 isotype antibody.

51. Method according to embodiment 48, wherein the human IgG isotype antibody is a human IgG4 isotype antibody or a human IgG1 isotype antibody without a glycosylated glycosylation site in its Fab fragment/with exactly one glycosylation site (at position Asn 297 numbering according to Kabat).

52. Method according to embodiment 48, wherein the low conductivity aqueous solution has a conductivity value of about 0.5 mS/cm or less.

53. Method according to embodiment 52, wherein the low conductivity aqueous solution has a conductivity value of from about 0.03 µS/cm to about 0.5 mS/cm.

54. Method according to embodiment 53, wherein the low conductivity aqueous solution has a conductivity value of from about 0.05 µS/cm to about 0.35 mS/cm.

55. Method according to embodiment 54, wherein the low conductivity aqueous solution is not deionized water.

56. Method according to any one of embodiments 48 to 55, wherein the affinity chromatography is a protein A affinity chromatography or a Protein G affinity chromatography or a single chain Fv ligand (KappaSelect) affinity chromatography.

57. Method according to embodiment 56, wherein the affinity chromatography is a protein A affinity chromatography.

58. Method according to embodiment 56, wherein the protein A affinity chromatography is selected from the group comprising MabSelectSure affinity chromatography, ProSep vA affinity chromatography, Poros Mab Capture A affinity chromatography, ProSep Ultra Plus affinity chromatography, MabSelect SuRe LX, MabSelect, Eshmuno A, Toyopearl AF-rProtein A-650F; Toyopearl AF-rProtein A HC-650HF).

59. Method according to embodiment 48 or 49, wherein the content of a host cell protein is reduced.

60. Method according to any one of embodiments 59, wherein said host cell protein is a Chinese hamster ovary (CHO) host cell protein.

61. Method according to embodiment 60, wherein the host cell protein is a phospholipase.

62. Method according to embodiment 61, wherein the host cell protein is a phospholipase A, phospholipase B, phospholipase C or phospholipase D.

63. Method according to any one of embodiments 62, wherein the host cell protein is phospholipase B-like 2 (PLBL2).

64. Method according to embodiment 60, wherein the host cell protein is phospholipase B-like 2 (PLBL2) or Clusterin.

65. Method according to any of embodiments 48 to 64, wherein the low conductivity aqueous solution contains tris(hydroxymethyl)aminomethane (Tris).

66. Method according to embodiment 65, wherein the low conductivity aqueous solution comprises about 0.1 mM to about 10 mM Tris.

67. Method according to embodiment 66, wherein the low conductivity aqueous solution comprises about 0.1 mM to about 8 mM Tris.

68. Method according to embodiment 67, wherein the low conductivity aqueous solution comprises about 0.5 mM to about 6.5 mM Tris.

69. Method according to embodiment 68, wherein the low conductivity aqueous solution comprises about 2 mM Tris.

70. Method according to embodiment 65 to 69, wherein the low conductivity aqueous solution contains potassium phosphate.

71. Method according to embodiment 70, wherein the low conductivity aqueous solution comprises about 0.2 mM to about 5 mM potassium phosphate.

72. Method according to embodiment 71, wherein the low conductivity aqueous solution comprises about 0.05 mM to about 2 mM potassium phosphate.

73. Method according to embodiment 72, wherein the low conductivity aqueous solution comprises about 0.5 mM potassium phosphate.

74. Method according to any of embodiments 48 to 73, wherein the low conductivity aqueous solution has a pH of about 7 or higher.

75. Method according to embodiment 74, wherein the low conductivity aqueous solution has a pH of about 7.5 or higher.

76. Method according to embodiment 75, wherein the low conductivity aqueous solution has a pH of from about 7 to about 9.5.

77. Method according to embodiment 76, wherein the low conductivity aqueous solution has a pH of from about 7.5 to about 8.5.

78. Method according to embodiment 77, wherein the low conductivity aqueous solution has a pH of about 8.

79. Method according to embodiment 48 or 49, wherein the method additionally comprises washing the affinity chromatography material with a high conductivity aqueous solution before or after washing the affinity chromatography material with low conductivity aqueous solution.

80. Method according to embodiment 79, wherein the method additionally comprises washing the affinity chromatography material with a high conductivity aqueous solution before washing the affinity chromatography material with low conductivity aqueous solution.

81. Method according to embodiment 79, wherein the method additionally comprises washing the affinity chromatography material with a high conductivity aqueous solution and/or with a medium conductivity aqueous solution before or after washing the affinity chromatography material with low conductivity aqueous solution.

82. Method according to embodiment 79, wherein the method additionally comprises washing the affinity chromatography material with a high conductivity aqueous solution and/or with a medium conductivity aqueous solution before washing the affinity chromatography material with low conductivity aqueous solution.

83. Method according to any one of embodiments 79 to 82, wherein the high conductivity aqueous solution has a conductivity value of about 20 mS/cm or higher.

84. Method according to embodiment 83, wherein the high conductivity aqueous solution has a conductivity value of from about 20 mS/cm to about 100 mS/cm.

85. Method according to any one of embodiments 81 to 82, wherein the medium conductivity aqueous solution has a conductivity value of from more than 0.5 mS/cm to less than 20 mS/cm.

86. Method according to any one of embodiments 79 to 85, wherein the high or medium conductivity aqueous solution comprises an amino acid.

87. Method according to embodiment 86, wherein the high or medium conductivity aqueous solution comprises Histidine.

88. Method according to embodiment 86 or 87, wherein the high or medium conductivity aqueous solution comprises Histidine and Tris.

89. Method according to embodiment 48 or 49, wherein at least one additional chromatography method/step is performed after step e).

90. Method according to embodiment 89, wherein an additional ion exchange chromatography method/step is performed after step e).

91. Method according to embodiment 90, wherein an additional anion exchange chromatography method/step is performed after step e).

92. Method according to embodiment 90, wherein an additional cation exchange chromatography method/step is performed after step e).

93. Method according to embodiment 90, wherein an additional anion exchange chromatography method/step and an additional cation exchange chromatography method/step are performed after step e).

94. Method according to embodiment 48 or 49, wherein the method is without an hydrophobic interaction chromatography method/step.

95. Method according to any of embodiments 49 to 94, wherein the human IgG4 isotype antibody is an antibody against P-selectin or an antibody against factor IXa and factor X or an antibody against IL-13 or an antibody against amyloid beta.

96. Method according to any one of embodiments 48 or 50 to 94, wherein the human IgG1 isotype antibody is an antibody against Influenza B or an antibody against VEGF-A or an antibody against CD22 or a bispecific antibody against HER3 and EGFR or an antibody against amyloid beta or an antibody against Her2 or a bispecific antibody against Ang2 and VEGF-A or an antibody against carcinoembryonic antigen (CEA) and CD3.

97. Method for purifying a human IgG isotype antibody from a sample comprising the steps of
 a) providing a sample comprising a human IgG isotype antibody,
 b) purifying the human IgG isotype antibody with a affinity chromatography method/step, comprising washing the affinity chromatography material with low conductivity aqueous solution.

98. Method according to embodiment 97, wherein the human IgG isotype antibody is a human IgG4 isotype antibody or a human IgG1 isotype antibody.

99. Method according to embodiment 98, wherein the human IgG isotype antibody is a human IgG4 isotype antibody or a human IgG1 isotype antibody without a glycosylated glycosylation site in its Fab fragment/with exactly one glycosylation site (at position Asn 297 numbering according to Kabat).

100. Method according to any one of embodiments 97 to 99, wherein the low conductivity aqueous solution has a conductivity value of about 0.5 mS/cm or less.

101. Method according to embodiment 100, wherein the low conductivity aqueous solution has a conductivity value of from about 0.03 µS/cm to about 0.5 mS/cm.

102. Method according to embodiment 101, wherein the low conductivity aqueous solution has a conductivity value of from about 0.05 µS/cm to about 0.35 mS/cm.

103. Method according to embodiment 102, wherein the low conductivity aqueous solution is not deionized water.

104. Method according to any one of embodiments 97 to 104, wherein the affinity chromatography is a protein A affinity chromatography or a Protein G affinity chromatography or a single chain Fv ligand (KappaSelect) affinity chromatography.

105. Method according to embodiment 104, wherein the affinity chromatography is a protein A affinity chromatography.

106. Method according to embodiment 105, wherein the protein A affinity chromatography is selected from the group comprising MabSelectSure affinity chromatography, ProSep vA affinity chromatography, Poros Mab Capture A affinity chromatography, ProSep Ultra Plus affinity chromatography, MabSelect SuRe LX, MabSelect, Eshmuno A, Toyopearl AF-rProtein A-650F; Toyopearl AF-rProtein A HC-650HF).

107. Method according to any one of embodiments 97 to 106, wherein the content of a host cell protein is reduced.

108. Method according to embodiment 107, wherein said host cell protein is a Chinese hamster ovary (CHO) host cell protein.

109. Method according to embodiment 108, wherein the host cell protein is a phospholipase.

110. Method according to embodiment 109, wherein the host cell protein is a phospholipase A, phospholipase B, phospholipase C or phospholipase D.

111. Method according to any one of embodiments 110, wherein the host cell protein is phospholipase B-like 2 (PLBL2).

112. Method according to embodiment 107, wherein the host cell protein is phospholipase B-like 2 (PLBL2) or Clusterin.

113. Method according to any one of embodiments 97 to 112, wherein the low conductivity aqueous solution contains tris(hydroxymethyl)aminomethane (Tris).

114. Method according to embodiment 113, wherein the low conductivity aqueous solution comprises about 0.1 mM to about 10 mM Tris.

115. Method according to embodiment 114, wherein the low conductivity aqueous solution comprises about 0.1 mM to about 8 mM Tris.

116. Method according to embodiment 115, wherein the low conductivity aqueous solution comprises about 0.5 mM to about 6.5 mM Tris.

117. Method according to embodiment 116, wherein the low conductivity aqueous solution comprises about 2 mM Tris.

118. Method according to any one of embodiments 113 to 117, wherein the low conductivity aqueous solution contains potassium phosphate.

119. Method according to embodiment 118, wherein the low conductivity aqueous solution comprises about 0.2 mM to about 5 mM potassium phosphate.

120. Method according to embodiment 119, wherein the low conductivity aqueous solution comprises about 0.2 mM to about 2 mM potassium phosphate.

121. Method according to embodiment 120, wherein the low conductivity aqueous solution comprises about 0.5 mM potassium phosphate.

122. Method according to any one of embodiments 97 to 121, wherein the low conductivity aqueous solution has a pH of about 7 or higher.

123. Method according to embodiment 122, wherein the low conductivity aqueous solution has a pH of about 7.5 or higher.

124. Method according to embodiment 123, wherein the low conductivity aqueous solution has a pH of from about 7 to about 9.5.

125. Method according to embodiment 124, wherein the low conductivity aqueous solution has a pH of from about 7.5 to about 8.5.

126. Method according to embodiment 125, wherein the low conductivity aqueous solution has a pH of about 8.

127. Method according to any one of embodiments 97 to 126, wherein the method additionally comprises washing the affinity chromatography material with a high conductivity aqueous solution before or after washing the affinity chromatography material with low conductivity aqueous solution.

128. Method according to embodiment 127, wherein the method additionally comprises washing the affinity chromatography material with a high conductivity aqueous solution before washing the affinity chromatography material with low conductivity aqueous solution.

129. Method according to embodiment 127, wherein the method additionally comprises washing the affinity chromatography material with a high conductivity aqueous solution and/or with a medium conductivity aqueous solution before or after washing the affinity chromatography material with low conductivity aqueous solution.

130. Method according to embodiment 127, wherein the method additionally comprises washing the affinity chromatography material with a high conductivity aqueous solution and/or with a medium conductivity aqueous solution before washing the affinity chromatography material with low conductivity aqueous solution.

131. Method according to any one of embodiments 127 to 130, wherein the high conductivity aqueous solution has a conductivity value of about 20 mS/cm or higher.

132. Method according to embodiment 131, wherein the high conductivity aqueous solution has a conductivity value of from about 20 mS/cm to about 100 mS/cm.

133. Method according to embodiment 129 or 130, wherein the medium conductivity aqueous solution has a conductivity value of from more than 0.5 mS/cm to less than 20 mS/cm.

134. Method according to any one of embodiments 127 to 133, wherein the high or medium conductivity aqueous solution comprises an amino acid.

135. Method according to embodiment 134, wherein the high or medium conductivity aqueous solution comprises Histidine.

136. Method according to embodiment 134, wherein the high or medium conductivity aqueous solution comprises Histidine and Tris.

137. Method according to embodiment 97 or 98, wherein at least one additional chromatography method/step is performed after step b).

138. Method according to embodiment 137, wherein an additional ion exchange chromatography method/step is performed after step b).

139. Method according to embodiment 138, wherein an additional anion exchange chromatography method/step is performed after step b).

140. Method according to embodiment 138, wherein an additional cation exchange chromatography method/step is performed after step b).

141. Method according to embodiment 138, wherein an additional anion exchange chromatography method/step and an additional cation exchange chromatography method/step are performed after stepb).

142. Method according to any one of embodiments 97 to 141, wherein the method is without an hydrophobic interaction chromatography method/step.

143. Method according to embodiment 97 or 98, wherein the human IgG4 isotype antibody is an antibody against P-selectin or an antibody against factor IXa and factor X or an antibody against IL-13 or an antibody against amyloid beta.

144. Method according to embodiment 97 or 98, wherein the human IgG1 isotype antibody is an antibody against Influenza B or an antibody against VEGF-A or an antibody against CD22 or an (bispecific) antibody against HER3 and EGFR or an antibody against amyloid beta or an antibody against Her2 or a bispecific antibody against Ang2 and VEGF-A or a bispecific antibody against carcinoembryonic antigen (CEA) and CD3.

145. Use of a low conductivity aqueous solution in a wash step of a protein A chromatography for reducing the content of a host cell protein wherein the protein A chromatography is used to purify a human IgG4 or IgG1 isotype antibody, wherein the low conductivity aqueous solution has a conductivity value of about 0.5 mS/cm or less.

146. Method for producing a human IgG4 or IgG1 isotype antibody comprising the steps of
  a) cultivating a cell comprising a nucleic acid encoding a human IgG4 or IgG1 isotype antibody,
  b) recovering the human IgG4 or IgG1 isotype antibody from the cell or the cultivation medium,
  c) contacting the human IgG4 or IgG1 isotype antibody with a protein A chromatography material,
  d) washing the protein A chromatography material with a low conductivity aqueous solution, wherein the low conductivity aqueous solution has a conductivity value of about 0.5 mS/cm or less,
  e) recovering the human IgG4 or IgG1 isotype antibody from the protein A chromatography material
  and thereby producing the human IgG4 or IgG1 isotype antibody.

147. Method for purifying a human IgG4 or IgG1 isotype antibody from a sample comprising the steps of
  a) providing a sample comprising a human IgG4 or IgG1 isotype antibody,
  b) purifying the human IgG4 or IgG1 isotype antibody with a protein A chromatography method/step, comprising washing the protein A chromatography material with a low conductivity aqueous solution, wherein the low conductivity aqueous solution has a conductivity value of about 0.5 mS/cm or less.

148. Use according to any of embodiments 5 to 7, wherein the low conductivity aqueous solution is deionized water.

149. Method according to embodiment 54, wherein the low conductivity aqueous solution is deionized water.

Description of the Sequence Listing

SEQ ID NO: 01 variable heavy chain domain VH of <VEGF>
SEQ ID NO: 02 variable light chain domain VL of <VEGF>
SEQ ID NO: 03 variable heavy chain domain VH of <ANG-2>
SEQ ID NO: 04 variable light chain domain VL of <ANG-2>
SEQ ID NO: 05 variable heavy chain domain VH of anti-amyloid beta antibody (IgG1 isotype)
SEQ ID NO: 06 variable light chain domain VL of anti-amyloid beta antibody (IgG1 isotype)
SEQ ID NO: 07 variable heavy chain domain VH1 of anti-P-selectin antibody
SEQ ID NO: 08 variable heavy chain domain VH2 of anti-P-selectin antibody
SEQ ID NO: 09 variable heavy chain domain VH3 of anti-P-selectin antibody
SEQ ID NO: 10 variable light chain domain VL1 of anti-P-selectin antibody
SEQ ID NO: 11 variable light chain domain VL2 of anti-P-selectin antibody
SEQ ID NO: 12 variable light chain domain VL3 of anti-P-selectin antibody Example 1

Material and Methods
Antibodies

The current invention is exemplified using a number of exemplary antibodies, including: an antibody against P-selectin (anti-P-selectin antibody; inclacumab; IgG4 isotype)

as described in WO 2005/100402 or SEQ ID NO: 07 to SEQ ID NO: 12; a bispecific antibody against factor IXa and factor X (anti-FIXa/X antibody; IgG4 isotype) as described in WO 2012/067176; with an antibody against Her2; a bispecific antibody against Ang2 and VEGF-A (anti-Ang2/VEGF-A antibody; vanucizumab; IgG1 isotype) as described in WO 2011/117329 or SEQ ID NO: 01 to SEQ ID NO: 04; an antibody against amyloid beta (anti-amyloid beta antibody; gantenerumab; IgG1 isotype) as described in WO 2003/070760 or SEQ ID NO: 05 to SEQ ID NO: 06. Also included herein are a number of IgG1 antibodies and IgG4 antibodies, as described in the examples below.

Detection Methods for Overall Host Cell Protein (HCP), Phospholipase B-Like 2 Protein (PLBL2) and Clusterin a) CHO HCP Assay The residual CHO HCP content in process samples is determined by an electrochemiluminescence immunoassay (ECLIA) on cobas e 411 immunoassay analyzer (Roche Diagnostics).

The assay is based on a sandwich principle using polyclonal anti-CHO HCP antibody from sheep.

First incubation: Chinese hamster ovary host cell protein (CHO HCP) from 15 µL sample (neat and/or diluted) and a biotin conjugated polyclonal CHO HCP specific antibody form a sandwich complex, which becomes bound to streptavidin-coated microparticles via interaction of biotin with streptavidin.

Second incubation: After addition of polyclonal CHO HCP-specific antibody labeled with ruthenium complex (Tris(2,2'-bipyridyl)ruthenium(II)-complex) a ternary sandwich complex is formed on the microparticles.

The reaction mixture is aspirated into the measuring cell where the microparticles are magnetically captured onto the surface of the electrode. Unbound substances are then removed in a washing step. Application of a voltage to the electrode then induces chemiluminescent emission which is measured by a photomultiplier.

The concentration of CHO HCP in the test sample is finally calculated from a CHO HCP standard curve of known concentration.

b) CHO PLBL2 Assay

The residual Chinese hamster ovary (CHO) Phospholipase B-like 2 protein (PLBL2) content in process samples is determined by an electrochemiluminescence immunoassay (ECLIA) on cobas e 411 immunoassay analyzer (Roche Diagnostics).

The assay is based on a sandwich principle using monoclonal anti-CHO PLBL2 antibody from mouse.

In a first incubation step, CHO PLBL2 from 30 µL sample (neat and/or diluted), biotin labeled monoclonal CHO PLBL2-specific antibody, and a monoclonal CHO PLBL2-specific antibody labeled with a ruthenium complex (Tris(2,2'-bipyridyl)ruthenium(II)-complex) form a sandwich complex.

In a second step after addition of streptavidin-coated microparticles, the ternary complex becomes bound to the solid phase via interaction of biotin and streptavidin.

The reaction mixture is aspirated into the measuring cell where the microparticles are magnetically captured onto the surface of the electrode. Unbound substances are then removed in a washing step. Application of a voltage to the electrode then induces chemiluminescence, which is measured by a photomultiplier.

The concentration of CHO PLBL2 in the test sample is finally calculated from a CHO PLBL2 standard curve of known concentration.

c) Clusterin Assay

The residual Clusterin content in process samples is determined by a commercial assay from Merck Millipore (GyroMark HT Kit GYRCLU-37K) which was used according to the manufacturer's instructions.

In brief, this assay is a Sandwich ELISA based, sequentially, on:

1) binding of the rat Clusterin biotinylated capture antibody to the streptavidin coated affinity columns of the Bioaffy 1000 nL CD, 2) capture of rat Clusterin molecules from samples to the anti Clusterin antibody, 3) binding of a second dye-labeled anti Clusterin detection antibody to the captured molecules, 4) quantification of the rat Clusterin using the Gyrolab Evaluator.

Example 2

Purification of an Anti-P-Selectin Antibody (IgG4 Isotype) in a Protein A Chromatography Antibody: Anti-P-Selectin General Chromatography Conditions Column resin: Protein A material "Mab Select SuRe" (GE-Healthcare) Ø1 cm, Height: 20.1 cm, CV: 15.79 ml Equipment: Äkta Avant 150

Flow rate: 300 cm/h during all steps

A solution containing an anti-P-Selectin antibody, was applied to a Protein A affinity column after equilibration (step 1) of the column. Initial load of PLBL2 determined in solution containing an anti-P-Selectin antibody: 335 ng PLBL2/mg of antibody. Initial load of Clusterin determined in solution containing an anti-P-Selectin antibody: 2874.8 ng Clusterin/mg of antibody. Initial load of CHOP determined in solution containing an anti-P-Selectin antibody: 100971 ng CHOP/mg of antibody.

The chromatographic steps were performed according to the following general scheme:

Step 1: Equilibration:
Step 2: Load of antibody containing solution
Step 3: Wash I
Step 4: Wash II
Step 5: Wash III
Step 6: Wash IV (additional wash)
Step 7: Elution After Elution from Protein A affinity column the protein was determined by size exclusion chromatography (SEC) and spectrophotometrically (OD) Analytics.

SEC:
Resin: TSK 3000 (Tosoh)
Column: 300×7.8 mm
Flow rate: 0.5 ml/min
Buffer: 200 mM potassium phosphate containing 250 mM potassium chloride, adjusted to pH 7.0
Wavelength: 280 nm OD:
Specific coefficient: 1.54
Wavelength: 280 nm minus 320 nm
Specific buffer conditions for Protein A chromatography (anti-P-Selectin antibody)

a) Control (Wash with Equilibration Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 25 mM Tris, 25 mM NaCl, pH 7.0
Step 5: Wash III: - - -
Step 6: Wash IV: - - -

Step 7: Elution: 50 mM acetic acid, pH 4.0
b) Low Conductivity Wash (with Tris Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 25 mM Tris, 25 mM NaCl, pH 7.0
Step 5: Wash III: 25 mM Tris, 25 mM NaCl, pH 7.0
Step 6: Wash IV: 2 mM Tris, pH 8.0
Step 7: Elution: 50 mM acetic acid, pH 4.0
c) Low Conductivity Wash (with Potassium Phosphate (KP) Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 25 mM Tris, 25 mM NaCl, pH 7.0
Step 5: Wash III: 25 mM Tris, 25 mM NaCl, pH 7.0
Step 6: Wash IV: 0.5 mM potassium phosphate, pH 8.0
Step 7: Elution: 50 mM acetic acid, pH 4.0
d) High Conductivity Wash (with Tris Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 700 mM Tris, pH 7.2
Step 5: Wash III: 25 mM Tris, 25 mM NaCl, pH 7.0
Step 6: Wash IV: - - -
Step 7: Elution: 50 mM acetic acid, pH 4.0
e) Low Conductivity Wash (with Tris Buffer Only; pH 6.0)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 25 mM Tris, 25 mM NaCl, pH 7.0
Step 5: Wash III: 25 mM Tris, 25 mM NaCl, pH 7.0
Step 6: Wash IV: 2 mM Tris, pH 6.0
Step 7: Elution: 50 mM acetic acid, pH 4.0
f) High Conductivity Wash (with Histidine (his)/Tris Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 200 mM His/1000 mM Tris, pH 7.0
Step 5: Wash III: 25 mM Tris, 25 mM NaCl, pH 7.0
Step 6: Wash IV: - - -
Step 7: Elution: 50 mM acetic acid, pH 4.0
g) Low Conductivity Tris+High Conductivity Histidine (his)/Tris
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 200 mM His/1000 mM Tris, pH 7.0
Step 5: Wash III: 25 mM Tris, 25 mM NaCl, pH 7.0
Step 6: Wash IV: 2 mM Tris, pH 8.0
Step 7: Elution: 50 mM acetic acid, pH 4.0
h) Low Conductivity Potassium Phosphate (KP)+High Conductivity Histidine (His)/Tris
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 200 mM His/1000 mM Tris, pH 7.0
Step 5: Wash III: 25 mM Tris, 25 mM NaCl, pH 7.0
Step 6: Wash IV: 0.5 mM potassium phosphate, pH 8.0
Step 7: Elution: 50 mM acetic acid, pH 4.0
i) Low Conductivity Tris+High Conductivity Tris
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 700 mM Tris, pH 7.2
Step 5: Wash III: 25 mM Tris, 25 mM NaCl, pH 7.0
Step 6: Wash IV: 2 mM Tris, pH 8.0
Step 7: Elution: 50 mM acetic acid, pH 4.0
j) Low Conductivity Tris; pH 6.0+High Conductivity Tris
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 700 mM Tris, pH 7.2
Step 5: Wash III: 25 mM Tris, 25 mM NaCl, pH 7.0
Step 6: Wash IV: 2 mM Tris, pH 6.0
Step 7: Elution: 50 mM acetic acid, pH 4.0
Results:

| Run | HCP total [ng/mg] | PLBL2 [ng/mg] | Clusterin [ng/mg] | Yield [%] |
| --- | --- | --- | --- | --- |
| a | 218 | 105.9 | 27.4 | 93.44 |
| b | 105 | 0.8 | 11.2 | 94.61 |
| c | 114 | 0.7 | 11.8 | 86.67 |
| d | 48 | 14.7 | 23.2 | 89.33 |
| e | 155 | 18.7 | 53.8 | 107.3 |
| f | 106 | 2.9 | 21.6 | 84.9 |
| g | 83 | 0.4 | 11.8 | 85 |
| h | 91 | 0.4 | 9.1 | 80.34 |
| i | 90 | 0.4 | 15.7 | 84.92 |
| j | 141 | 1.5 | 53 | 106.9 |

Example 3

Purification of an Anti-Amyloid Beta Antibody (IgG1 Isotype) in a Protein A Chromatography General conditions were according to the conditions described in Example 2.

Antibody: anti-amyloid beta.

Initial load of PLBL2 determined in solution containing an anti-amyloid beta antibody: 2019.7 ng PLBL2/mg of antibody. Initial load of CHOP determined in solution containing an anti-amyloid beta antibody: 578908 ng CHOP/mg of antibody.

Specific buffer conditions for Protein A chromatography
a) Control (Wash with Equilibration Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 25 mM Tris, 25 mM NaCl, pH 7.0
Step 5: Wash III: - - -
Step 6: Wash IV: - - -
Step 7: Elution: 50 mM acetic acid, pH 4.0
b) Low Conductivity Wash (with Tris Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 25 mM Tris, 25 mM NaCl, pH 7.0
Step 5: Wash III: 25 mM Tris, 25 mM NaCl, pH 7.0
Step 6: Wash IV: 2 mM Tris, pH 8.0
Step 7: Elution: 50 mM acetic acid, pH 4.0
c) High Conductivity Wash (with Tris Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 700 mM Tris, pH 7.2
Step 5: Wash III: 25 mM Tris, 25 mM NaCl, pH 7.0
Step 6: Wash IV: - - -
Step 7: Elution: 50 mM acetic acid, pH 4.0
d) Low Conductivity Tris+High Conductivity Histidine (his)/Tris
Step 1: Equilibration: 25 mM Tris, 25 mM NaCl, pH 7.0
Step 2: Load Step 3: Wash I: 25 mM Tris, 25 mM NaCl, pH 7.0
Step 4: Wash II: 200 mM His/1000 mM Tris, pH 7.0
Step 5: Wash III: 25 mM Tris, 25 mM NaCl, pH 7.0
Step 6: Wash IV: 2 mM Tris, pH 8.0
Step 7: Elution: 50 mM acetic acid, pH 4.0

| Run | HCP total [ng/mg] | PLBL2 [ng/mg] | Clusterin [ng/mg] | Yield [%] |
|---|---|---|---|---|
| a | 6828 | 17.3 | n.d. | 80.3 |
| b | 7794 | 17.8 | n.d. | 73.1 |
| c | 1595 | 1.7 | n.d. | 55.6 |
| d | 6132 | 2.3 | n.d. | 67.3 |

Example 4

Purification of an Anti-Her2 Antibody (IgG1 Isotype) in a Protein a Chromatography
General conditions were according to the conditions described in Example 2.
Antibody: anti-Her2
Initial load of PLBL2 determined in solution containing an anti-Her2 antibody: 1662.5 ng PLBL2/mg of antibody. Initial load of CHOP determined in solution containing an anti-Her2 antibody: 727070 ng CHOP/mg of antibody.
Specific buffer conditions for Protein A chromatography
a) Control (Wash with Equilibration Buffer Only)
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 25 mM Tris, 25 mM NaCl, pH 7.0
    Step 5: Wash III: - - -
    Step 6: Wash IV: - - -
    Step 7: Elution: 50 mM acetic acid, pH 4.0
b) Low Conductivity Wash (with Tris Buffer Only)
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 25 mM Tris, 25 mM NaCl, pH 7.0
    Step 5: Wash III: 25 mM Tris, 25 mM NaCl, pH 7.0
    Step 6: Wash IV: 2 mM Tris, pH 8.0
    Step 7: Elution: 50 mM acetic acid, pH 4.0
c) High Conductivity Wash (with Tris Buffer Only)
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 700 mM Tris, pH 7.2
    Step 5: Wash III: 25 mM Tris, 25 mM NaCl, pH 7.0
    Step 6: Wash IV: - - -
    Step 7: Elution: 50 mM acetic acid, pH 4.0
d) Low Conductivity Tris+High Conductivity Histidine (his)/Tris
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 200 mM His/1000 mM Tris, pH 7.0
    Step 5: Wash III: 25 mM Tris, 25 mM NaCl, pH 7.0
    Step 6: Wash IV: 2 mM Tris, pH 8.0
    Step 7: Elution: 50 mM acetic acid, pH 4.0

| Run | HCP total [ng/mg] | PLBL2 [ng/mg] | Clusterin [ng/mg] | Yield [%] |
|---|---|---|---|---|
| a | 309 | 1.2 | n.d. | 85.5 |
| b | 227 | 1 | n.d. | 77 |
| c | 26 | 0.2 | n.d. | 70.9 |
| d | 42 | 0.5 | n.d. | 83.8 |

Example 5

Purification of a Bispecific Anti-Ang2/VEGF-A Antibody (IgG1 Isotype) in a Protein A Chromatography
General conditions were according to the conditions described in Example 2.
Antibody: anti-Ang2/VEGF-A
Initial load of PLBL2 determined in solution containing a bispecific anti-Ang2/VEGF-A antibody: 919.7 ng PLBL2/mg of antibody. Initial load of CHOP determined in solution containing an anti-Ang2/VEGF-A: 682304 ng CHOP/mg of antibody.
Specific buffer conditions for Protein A chromatography
a) Control (Wash with Equilibration Buffer Only)
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 25 mM Tris, 25 mM NaCl, pH 7.0
    Step 5: Wash III: - - -
    Step 6: Wash IV: - - -
    Step 7: Elution: 50 mM acetic acid, pH 4.0
b) Low Conductivity Wash (with Tris Buffer Only)
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 25 mM Tris, 25 mM NaCl, pH 7.0
    Step 5: Wash III: 25 mM Tris, 25 mM NaCl, pH 7.0
    Step 6: Wash IV: 2 mM Tris, pH 8.0
    Step 7: Elution: 50 mM acetic acid, pH 4.0
c) High Conductivity Wash (with Tris Buffer Only)
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 700 mM Tris, pH 7.2
    Step 5: Wash III: 25 mM Tris, 25 mM NaCl, pH 7.0
    Step 6: Wash IV: - - -
    Step 7: Elution: 50 mM acetic acid, pH 4.0
d) Low Conductivity Tris+High Conductivity Histidine (his)/Tris
    Step 1: Equilibration: 25 mM Tris, 25 mM NaCl, pH 7.0
    Step 2: Load
    Step 3: Wash I: 25 mM Tris, 25 mM NaCl, pH 7.0
    Step 4: Wash II: 200 mM His/1000 mM Tris, pH 7.0
    Step 5: Wash III: 25 mM Tris, 25 mM NaCl, pH 7.0
    Step 6: Wash IV: 2 mM Tris, pH 8.0
    Step 7: Elution: 50 mM acetic acid, pH 4.0

| Run | HCP total [ng/mg] | PLBL2 [ng/mg] | Clusterin [ng/mg] | Yield [%] |
|---|---|---|---|---|
| a | 3035 | 1.0 | n.d. | 85.0 |
| b | 1707 | 0.8 | n.d. | 79.8 |
| c | 655 | 0.7 | n.d. | 52 |
| d | 1050 | 0.8 | n.d. | 92.3 |

Example 6

Purification of a Bispecific Anti-FIXa/X Antibody (IgG4 Isotype) in a Protein a Chromatography Purification of anti-FIXa/X antibody was tested in two different chromatograhpy settings:

Setting 1

General conditions were according to the conditions described in Example 2.

Antibody: anti-FIXa/X

Initial load of PLBL2 determined in solution containing an anti-FIXa/X antibody: 557 ng PLBL2/mg of antibody. Initial load of CHOP determined in solution containing an anti-FIXa/X: 387377 ng CHOP/mg of antibody.

Specific buffer conditions for Protein A chromatography a) High Conductivity Wash (with Tris Buffer Only)
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 700 mM Tris, pH 7.2
Step 5: Wash III: 25 mM Tris, 25 mM NaCl, pH 7.0
Step 6: Wash IV: - - -
Step 7: Elution: 50 mM acetic acid, pH 4.0 b) Low Conductivity Tris+High Conductivity Histidine (his)/Tris
Step 1: Equilibration: 25 mM Tris, 25 mM NaCl, pH 7.0
Step 2: Load
Step 3: Wash I: 25 mM Tris, 25 mM NaCl, pH 7.0
Step 4: Wash II: 200 mM His/1000 mM Tris, pH 7.0
Step 5: Wash III: 25 mM Tris, 25 mM NaCl, pH 7.0
Step 6: Wash IV: 2 mM Tris, pH 8.0
Step 7: Elution: 50 mM acetic acid, pH 4.0

| Run | HCP total [ng/mg] | PLBL2 [ng/mg] | Clusterin [ng/mg] | Yield [%] |
|---|---|---|---|---|
| a | 1632 | 19.1 | n.d. | 79 |
| b | 2148 | 1.1 | n.d. | 77 |

Setting 2

General Chromatography Conditions

Column resin: Protein A material "Mab Select SuRe" (GE-Healthcare) Ø1 cm,
Height: 20.1 cm, CV: 15.79 ml
Equipment: Äkta Avant 150
Flow rate: 300 cm/h during all steps A solution containing an anti-FIXa/X antibody, was applied to a Protein A affinity column after equilibration (step 1) of the column.

Initial load of PLBL2 determined in solution containing an anti-FIXa/X antibody: 557 ng PLBL2/mg of antibody.

The chromatographic steps were performed according to the following general scheme:
Step 1: Equilibration:
Step 2: Load of antibody containing solution
Step 3: Wash I
Step 4: Wash II
Step 5: Wash III (additional wash)
Step 6: Elution Specific buffer conditions for Protein A chromatography a) High Conductivity Wash (with NaSO4 Buffer Only)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: - - -
Step 6: Elution: 35 mM acetic acid, pH 4.0 b) Low Conductivity Wash (Tris 1 mM)+High Conductivity Wash (with NaSO4)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: 1 mM Tris, pH 8.0
Step 6: Elution: 50 mM acetic acid, pH 4.0 c) Low Conductivity Wash (Tris 2 mM)+High Conductivity Wash (with NaSO4)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: 2 mM Tris, pH 8.0
Step 6: Elution: 35 mM acetic acid, pH 4.0 d) Low Conductivity Wash (Tris 4 mM)+High Conductivity Wash (with NaSO4)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: 4 mM Tris, pH 8.0
Step 6: Elution: 50 mM acetic acid, pH 4.0 e) Low Conductivity Wash (Tris 6 mM)+High Conductivity Wash (with NaSO4)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: 6 mM Tris, pH 8.0
Step 6: Elution: 50 mM acetic acid, pH 4.0 f) Low Conductivity Wash (Tris 4 mM, pH 7.8)+High Conductivity Wash (with NaSO4)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: 4 mM Tris, pH 7.8
Step 6: Elution: 50 mM acetic acid, pH 4.0 g) Low Conductivity Wash (Tris 4 mM, pH 8.2)+High Conductivity Wash (with NaSO4)
Step 1: Equilibration: 20 mM NaPO4, pH 7.5
Step 2: Load
Step 3: Wash I: 450 mM NaSO4, 20 mM NaAc, pH 4.8
Step 4: Wash II: 20 mM NaPO4, pH 7.5
Step 5: Wash III: 4 mM Tris, pH 8.2
Step 6: Elution: 50 mM acetic acid, pH 4.0 h) Low Conductivity Wash (Tris 2 mM)+High Conductivity Wash (with Histidine (His)/Tris 1 M)
Step 1: Equilibration: 20 mM NaPO4, pH 7.5
Step 2: Load
Step 3: Wash I: 200 mM His/1000 mM Tris, pH 7.0
Step 4: Wash II: 20 mM NaPO4, pH 7.5
Step 5: Wash III: 2 mM Tris, pH 8.0
Step 6: Elution: 35 mM acetic acid, pH 4.0 i) Low Conductivity Wash (Tris 2 mM)+High Conductivity Wash (Histidine (his)/Tris 0.85 M)
Step 1: Equilibration: 20 mM NaPO4, pH 7.5
Step 2: Load
Step 3: Wash I: 200 mM His/850 mM Tris, pH 7.0
Step 4: Wash II: 20 mM NaPO4, pH 7.5
Step 5: Wash III: 2 mM Tris, pH 8.0
Step 6: Elution: 50 mM acetic acid, pH 4.0 j) Low Conductivity Wash (Tris 2 mM)+High Conductivity Wash (Histidine (his)/Tris 0.7 M)

Step 1: Equilibration: 20 mM NaPO4, pH 7.5
Step 2: Load
Step 3: Wash I: 200 mM His/700 mM Tris, pH 7.0
Step 4: Wash II: 20 mM NaPO4, pH 7.5
Step 5: Wash III: 2 mM Tris, pH 8.0
Step 6: Elution: 50 mM acetic acid, pH 4.0 k) Low Conductivity Wash (Tris 2 mM)+High Conductivity Wash (Histidine (his)/Tris 0.55 M)
Step 1: Equilibration: 20 mM NaPO4, pH 7.5
Step 2: Load
Step 3: Wash I: 200 mM His/550 mM Tris, pH 7.0
Step 4: Wash II: 20 mM NaPO4, pH 7.5
Step 5: Wash III: 2 mM Tris, pH 8.0
Step 6: Elution: 50 mM acetic acid, pH 4.0

| Run | HCP total [ng/mg] | PLBL2 [ng/mg] | Clusterin [ng/mg] | Yield [%] |
|---|---|---|---|---|
| a | 1518 | 204.2 | n.d. | 82 |
| b | 646 | 1 | n.d. | 73.8 |
| c | 737 | 1.2 | n.d. | 79 |
| d | 595 | 1.4 | n.d. | 78.5 |
| e | 685 | 1.8 | n.d. | 79.5 |
| f | 692 | 1.4 | n.d. | 78.2 |
| g | 707 | 1.1 | n.d. | 76.4 |
| h | 299 | 0.5 | n.d. | 79 |
| i | 140 | 0.4 | n.d. | 70 |
| j | 100 | 0.5 | n.d. | 71.9 |
| k | 112 | 0.7 | n.d. | 73 |

Example 7

General Procedure/Conditions:
Mock Cell Culture Fluid

Null harvested cell culture fluid was produced using non-transfected CHO-DP12 cells cultured in serum-free media. Fermentation was performed at the 2 L-scale using a representative cell culture process. At the end of 14 days of fermentation, cell culture fluid was harvested via centrifugation and sterile filtration. This harvested cell culture fluid (HCCF) was then stored at −70° C. until experimentation.

Purified PLBL2

Recombinant CHO PLBL2 with a C-terminal hexahistidine-tag was expressed in 35 L-scale transient transfections and purified from harvested cell culture fluid as previously described (Vanderlaan et al., 2015). Purified PLBL2 was then formulated in a PBS solution and stored at −70° C. until experimentation.

Purified Antibody

Recombinant humanized antibodies were expressed in CHO cells and purified using column chromatography to ensure PLBL2 concentration was below 20 ng/mg. Prior to beginning each study, each antibody was buffer-exchanged into PBS using PD-10 desalting columns (GE Healthcare).

Preparation of Load Material for Protein A Chromatography

To normalize the population and abundance of host cell proteins in the Protein A load across antibodies, purified antibodies were diluted to the same concentration with PBS and spiked into HCCF from a non-producing cell line to give a final antibody titer of 5 g/L. A control was also prepared wherein PBS was added instead of the purified antibody to evaluate non-specific host cell protein binding to the Protein A resin in the absence of antibody.

Packed-Bed Column Chromatography

All packed-bed column chromatography experiments were performed using a 0.66 cm inner diameter by 20 cm bed height MabSelect SuRe (GE Healthcare) Protein A resin column. For each purification, the column was first equilibrated for 3 column volumes (CVs) with 25 mM tris, 25 mM NaCl, pH 7.7 (equilibration buffer). Then Protein A load was applied to a target load density of 30 g antibody/L resin, after which the column was washed for 3 CVs with equilibration buffer, 3 CVs of different types of washing buffers, and again with 3 CVs of equilibration buffer. Subsequently, antibody was eluted at low pH with 0.1 to 0.15 M acetic acid, and eluate pools were collected starting at 0.5 OD at the beginning of the elution peak; pooling was terminated after 2.8 CVs. For the control run with PBS-spiked null HCCF, a 2.8 CV mock elution pool was generated starting from 1 CV to 3.8 CVs after the start of the elution phase. At the end of every run, each Protein A eluate was then titrated to pH 5.0 using 1.5 M tris base. The column was then cleaned with a 0.1 M sodium hydroxide solution. All phases had a volumetric flow rate of 20 CV/h except for the load, first equilibration wash, and elution phases, which had a flow rate of 15 CV/h.

A) Purification of an exemplary antibody (IgG4 isotype), Antibody A, in a protein A chromatography Specific washing buffer conditions for purification of Antibody A (IgG4 isotype) using the general procedure of Example 7 (as outlined above):
a) 0.4 M Potassium Phosphate, pH 7.0
b) 25 mM Tris, 25 mM NaCl, pH 7.7
c) 0.75 M Arg-HCl, pH 7.0
d) 0.6 M NaCl, pH 7.0
e) Deionized water Results:

| | HCP total [ng/mg] Load: 1067817 | PLBL2 [ng/mg] Load: 7668 |
|---|---|---|
| a | 1434 | 167 |
| b | 1440 | 107 |
| c | 331 | 40 |
| d | 1864 | 66 |
| e | 1204 | 31 |

B) Purification of an exemplary antibody (IgG1 isotype), Antibody B, in a protein A chromatography Specific washing buffer conditions for purification of Antibody B (IgG1 isotype) using the general procedure of Example 7:
a) Deionized water Results:

| | HCP total [ng/mg] Load: 1067817 | PLBL2 [ng/mg] Load: 7668 |
|---|---|---|
| a | 2630 | 71 |

C) Purification of an exemplary antibody (IgG4 isotype), Antibody C, in a protein A chromatography Specific washing buffer conditions for purification of Antibody C (IgG4 isotype) using the general procedure of Example 7:
a) 0.4 M Potassium Phosphate, pH 7.0
b) 25 mM Tris, 25 mM NaCl, pH 7.7
c) 0.75 M Arg-HCl, pH 7.0
d) 0.6 M NaCl, pH 7.0
e) Deionized water Results:

| | HCP total [ng/mg] Load: 1067817 | PLBL2 [ng/mg] Load: 7668 |
|---|---|---|
| a | 314 | 434 |
| b | 361 | 369 |
| c | 214 | 82 |
| d | 780 | 214 |
| e | 410 | 68 |

D) Purification of an exemplary antibody (IgG1 isotype), Antibody D, in a protein A chromatography Specific washing buffer conditions for purification of Antibody D (IgG1 isotype) using the general procedure of Example 7:
a) Deionized water

| | HCP total [ng/mg] Load: 1067817 | PLBL2 [ng/mg] Load: 7668 |
|---|---|---|
| a | 6427 | 28 |

E) Purification of an exemplary antibody (IgG1 isotype), Antibody E, in a protein A chromatography Specific washing buffer conditions for purification of Antibody E (IgG1 isotype) using the general procedure of Example 7:
a) 0.4 M Potassium Phosphate, pH 7.0
b) 31 mM Tris, pH 8.5
c) 55 mM Tris, pH 9.0
d) Deionized water Results:

| | HCP total [ng/mg] Load: 169706 | PLBL2 [ng/mg] Load: 333 |
|---|---|---|
| a | 1307 | 36 |
| b | 884 | 7 |
| c | 601 | 0.2 |
| d | 929 | 8 |

F) Purification of an exemplary antibody (IgG1 isotype), Antibody F, in a protein A chromatography Specific washing buffer conditions for purification of Antibody F using the general procedure of Example 7:
a) 25 mM Tris, pH 9.0

Results:

| | HCP total [ng/mg] Load: 994582 | PLBL2 [ng/mg] Load: 1363 |
|---|---|---|
| a | 806 | 0.5 |

The invention claimed is:

1. A method of reducing content of a host cell protein in a sample including a human IgG4 or IgG1 isotype antibody and the host cell protein, the method comprising the steps of:
   contacting a protein A chromatography material with the sample;
   washing the protein A chromatography material, after the contacting step, with a low conductivity aqueous solution, wherein the low conductivity aqueous solution has a conductivity value of about 0.5 mS/cm or less, wherein the amount of the host cell protein in the sample after the washing step is reduced, wherein said host cell protein is phospholipase B-like 2 (PLBL2), and wherein the low conductivity aqueous solution is deionized water.

2. The method according to claim 1, wherein the low conductivity aqueous solution wash step is preceded or succeeded by a high conductivity aqueous solution wash step.

3. The method according to claim 2, wherein the high conductivity aqueous solution has a conductivity value of about 20 mS/cm or higher.

4. The method according to claim 2 or 3, wherein the high conductivity aqueous solution comprises Histidine.

5. The method according to claim 1, wherein the human IgG4 isotype antibody is an antibody against P-selectin or an antibody against factor IXa and factor X or an antibody against IL-13 or an antibody against amyloid beta.

6. The method according to claim 1, wherein the human IgG1 isotype antibody is an antibody against Influenza B or an antibody against VEGF-A or an antibody against CD22 or a bispecific antibody against HER3 and EGFR or an antibody against amyloid beta or an antibody against Her2 or a bispecific antibody against Ang2 and VEGF-A or a bispecific antibody against carcinoembryonic antigen (CEA) and CD3.

7. A method for producing a human IgG4 or IgG1 isotype antibody comprising the steps of:
   a) cultivating a cell comprising a nucleic acid encoding a human IgG4 or IgG1 isotype antibody,
   b) recovering the human IgG4 or IgG1 isotype antibody from the cell or the cultivation medium,
   c) contacting the human IgG4 or IgG1 isotype antibody with a protein A chromatography material,
   d) washing the protein A chromatography material, after the contacting step, with a low conductivity aqueous solution, wherein the low conductivity aqueous solution has a conductivity value of about 0.5 mS/cm or less, wherein the amount of a host cell protein in the sample after the washing step is reduced, wherein said host cell protein is phospholipase B-like 2 (PLBL2),
   e) recovering the human IgG4 or IgG1 isotype antibody from the protein A chromatography material
   and thereby producing the human IgG4 or IgG1 isotype antibody;
   wherein the low conductivity aqueous solution is deionized water.

8. A method for purifying a human IgG4 or IgG1 isotype antibody from a sample comprising the steps of:
   a) providing a sample comprising a human IgG4 or IgG1 isotype antibody,
   b) purifying the human IgG4 or IgG1 isotype antibody with a protein A chromatography method/step, comprising contacting the sample with a protein A chromatography material and washing the protein A chromatography material, after the contacting step, with a low conductivity aqueous solution, wherein the low conductivity aqueous solution has a conductivity value of about 0.5 mS/cm or less, wherein the amount of a host cell protein in the sample after the washing step is reduced and wherein said host cell protein is phospholipase B-like 2 (PLBL2), wherein the low conductivity aqueous solution is deionized water.

9. The method according to claims 7 or 8, wherein the method additionally comprises washing the affinity chromatography material with a high conductivity aqueous solution and/or with a medium conductivity aqueous solution before or after washing the protein A chromatography material with low conductivity aqueous solution.

10. The method according to claim 9, wherein the high conductivity aqueous solution has a conductivity value of about 20 mS/cm or higher.

11. The method according to claim 9, wherein the medium conductivity aqueous solution has a conductivity value of from more than 0.5 mS/cm to less than 20 mS/cm.

12. The method according to claim 9, wherein the high or medium conductivity aqueous solution comprises Histidine.

13. The method according to claims 7 or 8, wherein the human IgG4 isotype antibody is an antibody against P-selectin or an antibody against factor IXa and factor X or an antibody against IL-13 or an antibody against amyloid beta.

14. The method according to claims 7 or 8, wherein the human IgG1 isotype antibody is an antibody against Influenza B or an antibody against VEGF-A or an antibody against CD22 or a bispecific antibody against HER3 and EGFR or an antibody against amyloid beta or an antibody against Her2 or a bi specific antibody against Ang2 and VEGF-A or a bispecific antibody against carcinoembryonic antigen (CEA) and CD3.

* * * * *